United States Patent
Little et al.

(10) Patent No.: US 12,419,223 B2
(45) Date of Patent: Sep. 23, 2025

(54) WRAP MATERIAL TRANSFER DEVICE

(71) Applicant: Vermeer Manufacturing Company, Pella, IA (US)

(72) Inventors: Daniel J. Little, Albia, IA (US); Calvin D. Meinders, Pella, IA (US); Nathan D. Dockter, Pella, IA (US); Kent P. Thoreson, Bussey, IA (US); Madison M. Delaney, Prairie City, IA (US); Jerry E. Bandstra, Pella, IA (US); Lisle J. Dunham, Grinnell, IA (US); Jacob Limke, Jamestown, ND (US); Kent L. Thompson, Otley, IA (US)

(73) Assignee: Vermeer Manufacturing Company, Pella, IA (US)

( * ) Notice: Subject to any disclaimer, the term of this patent is extended or adjusted under 35 U.S.C. 154(b) by 191 days.

(21) Appl. No.: 17/097,729

(22) Filed: Nov. 13, 2020

(65) Prior Publication Data

US 2021/0068345 A1    Mar. 11, 2021

Related U.S. Application Data

(62) Division of application No. 16/209,497, filed on Dec. 4, 2018, now abandoned.

(Continued)

(51) Int. Cl.
*A01F 15/07* (2006.01)
*B65B 11/02* (2006.01)

(52) U.S. Cl.
CPC ........ *A01F 15/0715* (2013.01); *B65B 11/025* (2013.01); *A01F 2015/0725* (2013.01); *A01F 2015/0735* (2013.01)

(58) Field of Classification Search
CPC .......... A01F 15/0715; A01F 2015/0725; A01F 2015/0735; B65B 11/025; B66C 23/04; B66C 23/44

(Continued)

(56) References Cited

U.S. PATENT DOCUMENTS 2,940,621 A * 6/1960 White ................... B60P 1/5433
                                                         212/175
3,063,574 A * 11/1962 Peterson ................. B66C 13/04
                                                         414/592

(Continued)

FOREIGN PATENT DOCUMENTS

EP          2229812 A1    9/2010
JP          H0680390 A    3/1992
WO      WO-9908955 A1 *   2/1999   ............. B66C 23/44

OTHER PUBLICATIONS

"Back Saver for Loading Cargo Into Pickups", Farm Show Magazine, vol. 33, Issue 1, p. #1, 2009.

(Continued)

*Primary Examiner* — Anna K Kinsaul
*Assistant Examiner* — David G Shutty
(74) *Attorney, Agent, or Firm* — Armstrong Teasdale LLP

(57) ABSTRACT

A transfer device includes an arm that has a first end and a second end. The transfer device includes a pivot positioned at the first end of the arm. The pivot is configured to be secured to a baling machine. The transfer device includes a lifting device positioned on the arm. The lifting device is configured to be attached to a bale wrap material supply roll.

20 Claims, 31 Drawing Sheets

Related U.S. Application Data

(60) Provisional application No. 62/594,418, filed on Dec. 4, 2017.

(58) Field of Classification Search
USPC .......................................................... 53/399
See application file for complete search history.

(56) References Cited

U.S. PATENT DOCUMENTS

| | | | | |
|---|---|---|---|---|
| 3,367,512 | A * | 2/1968 | Kaplan | B66C 23/48 212/294 |
| 3,578,179 | A * | 5/1971 | Fujioka | B60P 1/5433 212/292 |
| 4,226,331 | A * | 10/1980 | Dumond | B66C 23/44 212/258 |
| 4,523,684 | A * | 6/1985 | Baisden | B66C 23/04 212/175 |
| 4,556,358 | A * | 12/1985 | Harlan | B66C 23/36 212/238 |
| 4,621,741 | A * | 11/1986 | Boon | B66C 23/205 212/175 |
| 4,790,441 | A * | 12/1988 | Hansen | B66C 13/06 212/319 |
| 4,941,311 | A * | 7/1990 | Ardueser | A01F 15/0715 53/118 |
| 5,029,717 | A * | 7/1991 | Chambers | B66C 23/44 414/467 |
| 5,156,517 | A * | 10/1992 | Boissonneault | B60P 1/5471 414/467 |
| 5,181,368 | A * | 1/1993 | Anstey | A01F 15/0715 53/118 |
| 5,431,526 | A * | 7/1995 | Peterson | B66C 23/44 212/231 |
| 5,439,343 | A * | 8/1995 | Watson | B66F 11/046 414/744.3 |
| 5,459,891 | A * | 10/1995 | Reeve | A61G 7/1017 212/231 |
| 5,501,346 | A * | 3/1996 | Wimmer | B66C 23/54 212/231 |
| 5,752,799 | A * | 5/1998 | Carey | B60P 1/5471 224/403 |
| 5,803,437 | A | 9/1998 | Paterson et al. | |
| 5,853,282 | A * | 12/1998 | Bechler | B60P 1/548 414/921 |
| 5,979,141 | A * | 11/1999 | Phillips | A01F 15/0715 242/337 |
| 5,993,136 | A * | 11/1999 | Vickary | B66C 23/48 414/673 |
| 5,996,307 | A * | 12/1999 | Niemerg | A01F 15/0715 53/118 |
| 6,095,349 | A * | 8/2000 | O'Meara | B60R 9/06 212/293 |
| 6,152,675 | A * | 11/2000 | Compton | B60P 1/5495 224/403 |
| 6,272,816 | B1 * | 8/2001 | Viaud | A01F 15/0715 53/118 |
| 6,981,834 | B1 * | 1/2006 | Henry | B60P 1/5471 212/299 |
| 7,334,776 | B2 | 2/2008 | Kazerooni | |
| 7,377,740 | B2 * | 5/2008 | Panzarella | B60P 1/5433 212/180 |
| 7,419,347 | B1 * | 9/2008 | Cormier | B60R 9/06 224/524 |
| 7,430,959 | B2 * | 10/2008 | Routledge | A01F 15/08 100/88 |
| 7,484,750 | B2 * | 2/2009 | Van Vooren | A01D 43/086 280/491.4 |
| 7,717,663 | B1 * | 5/2010 | Stowers | B66C 23/36 414/921 |
| 7,878,347 | B2 * | 2/2011 | Alday | B66C 23/005 212/253 |
| 8,479,933 | B2 * | 7/2013 | Vaquera | B66C 23/44 254/323 |
| 8,869,688 | B2 * | 10/2014 | Bruning | A01F 15/12 56/341 |
| 8,919,085 | B2 * | 12/2014 | Smith | A01F 15/0715 53/587 |
| 8,925,287 | B2 * | 1/2015 | Derscheid | A01F 15/0715 53/118 |
| 9,217,535 | B1 * | 12/2015 | Egan | A61G 7/1061 |
| 9,283,130 | B2 * | 3/2016 | Walker | A61G 3/062 |
| 9,320,199 | B2 | 4/2016 | Smith et al. | |
| 9,327,947 | B2 * | 5/2016 | Davis | B66C 23/44 |
| 9,376,227 | B2 * | 6/2016 | Smith | B65B 13/04 |
| 10,730,723 | B1 * | 8/2020 | Spitsbergen | B66C 23/68 |
| 11,352,239 | B1 * | 6/2022 | Spitsbergen | B66C 23/203 |
| 2004/0256607 | A1 * | 12/2004 | Spitsbergen | B66C 23/44 254/323 |
| 2008/0149583 | A1 * | 6/2008 | Welker | B66C 23/44 212/180 |
| 2012/0012012 | A1 | 1/2012 | Bruening | |
| 2012/0048823 | A1 * | 3/2012 | Kriner | B66C 23/44 212/270 |
| 2018/0099601 | A1 * | 4/2018 | Martinez Romero | B60P 1/5433 |
| 2019/0330031 | A1 * | 10/2019 | Walker | B66C 23/166 |

OTHER PUBLICATIONS

"Electric Winch Automatically Raises Rolls of Net Wrap", Farm Show Magazine, vol. 31, Issue 2, p. 35, 2007.

Screen Shots from John Deer GoCotton: C690 Wrap Loading video, Jul. 28, 2014, obtained from https://www.youtube.com/watch?v=F05tSotuy-k.

\* cited by examiner

WRAP MATERIAL TRANSFER DEVICE

CROSS REFERENCE TO RELATED APPLICATIONS

This application is a Divisional of U.S. patent application Ser. No. 16/209,497, filed Dec. 4, 2018, which claims the benefit of U.S. Provisional Patent Application No. 62/594,418, filed Dec. 4, 2017. Both of these applications are incorporated herein by reference in their entirety.

BACKGROUND

Round balers have become an integral part of the agricultural industry and a variety of different types of balers are currently in use. In some examples, balers use a system of belts or a fixed chamber that compresses a crop material to form a bale. Common to all balers is the need to wrap the finished round bale with a wrap material that secures the bale. After the crop material has been picked up by the baler and a bale is completely formed in the chamber, the bale is then typically wrapped with a wrap material to keep the bale intact and protected. After the wrapping is completed, the bale is ejected from the baling chamber and is later picked up for storage or use.

Traditionally, wrap material is dispensed into the baling chamber from a roll. The wrap material roll often has considerable size and can be difficult to load onto the baler. Therefore, improvements in managing wrap material rolls are needed.

SUMMARY

One aspect of the present disclosure relates to a transfer device for a wrap material roll. In one possible configuration, and by non-limiting example, a transfer device having a lifting device attached to a pivotable arm is disclosed.

In one example of the present disclosure, a transfer device for a bale wrap material supply roll is disclosed. The transfer device includes an arm that has a first end and a second end. The transfer device includes a pivot positioned at the first end of the arm. The pivot is configured to be secured to a baling machine. The transfer device includes a lifting device positioned on the arm. The lifting device is configured to be attached to a bale wrap material supply roll.

In another example of the present disclosure, a baling machine is disclosed. The baling machine includes a frame and a baling chamber for creating a bale. The baling machine includes a wrap material bay for storing wrap material to be fed into the baling chamber. The baling machine includes a bale wrap material transfer device mounted within the wrap material bay. The transfer device has a lifting device that is configured to be attached to a bale wrap material supply roll. The transfer device is configured to lift, lower, and transfer the wrap material supply roll.

In another example of the present disclosure, a baling machine is disclosed. The baling machine includes a frame and a baling chamber for creating a bale. The baling machine includes a wrap material bay for storing wrap material to be fed into the baling chamber. The baling machine includes a bale wrap material transfer device. The bale wrap material transfer device includes an arm having a first end and a second end. The bale wrap material transfer device includes a pivot positioned at the first end of the arm. The pivot is secured to the frame of the baling machine. The bale wrap material transfer device includes a lifting device positioned on the arm. The lifting device is configured to be attached to a bale wrap material supply roll. The bale wrap material transfer device is configured to lift, lower, and transfer a bale wrap material supply roll.

In another example of the present disclosure, a method of transferring a bale wrap material roll is disclosed. The method includes extending an arm of a bale wrap material transfer device from a baler and lowering a portion of the bale wrap material transfer device. The method includes attaching a lifting device of the bale wrap material transfer device to a bale wrap material supply roll and raising a portion of the bale wrap material transfer device. The method includes positioning a bale wrap material supply roll on the baler for use.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
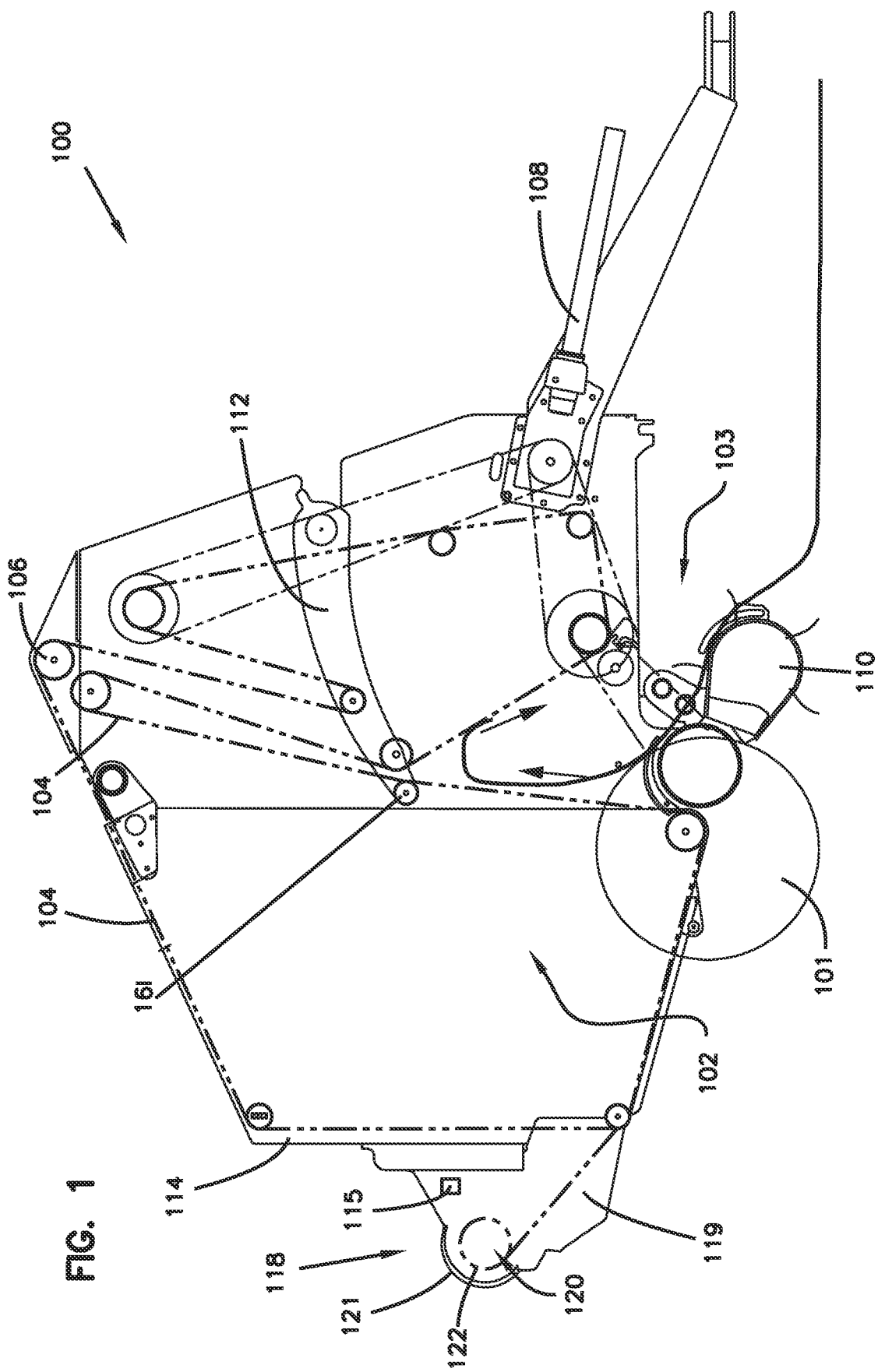
FIG. 1 is a schematic side view of an empty round baler, according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
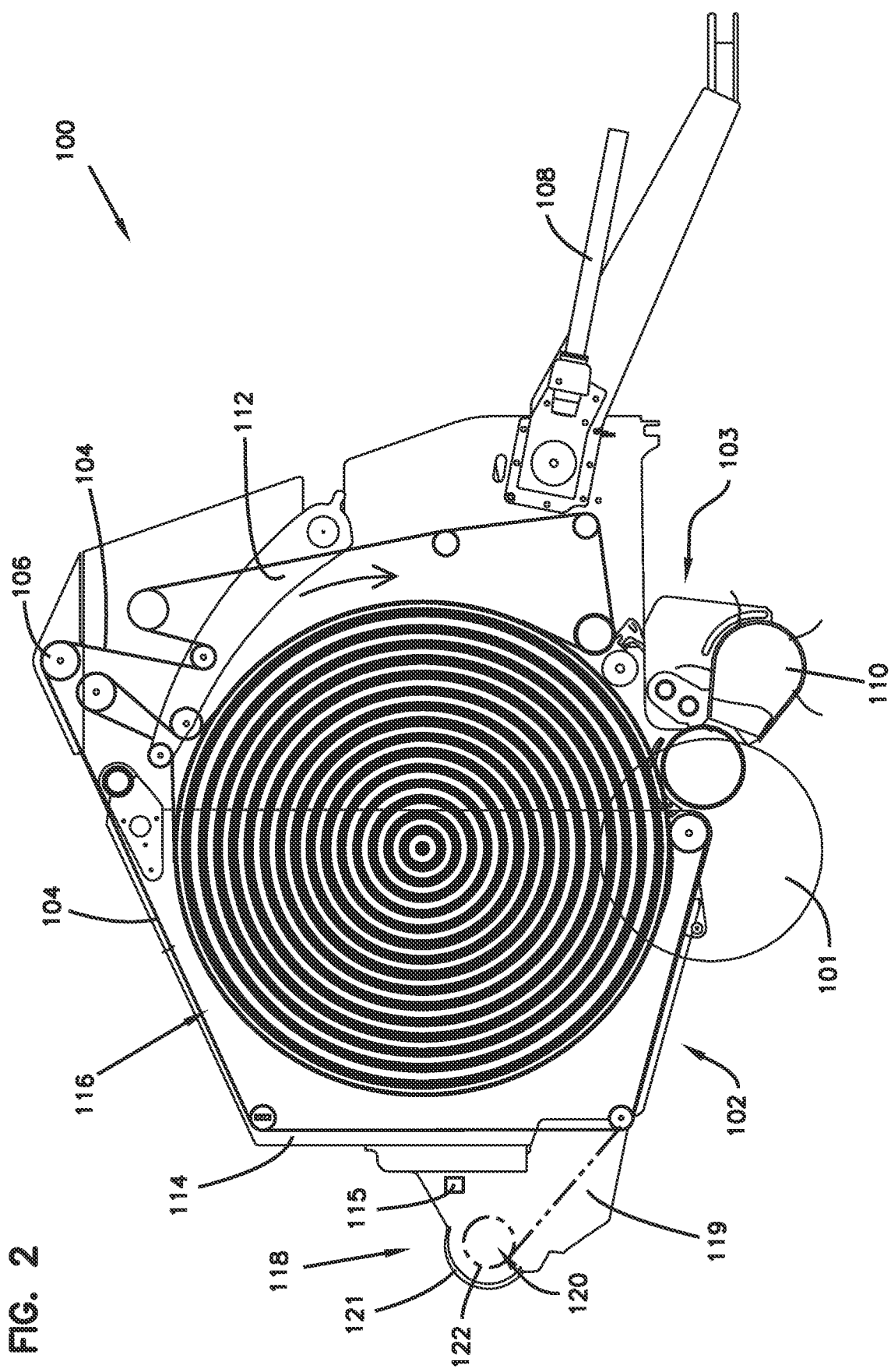
FIG. 2 is a schematic side view of the round baler of FIG. 1 with a full-sized bale positioned therein.

FIGS. 1 and 2 show a schematic side view of a round baler 100. The baler 100 can be towed behind a vehicle via wheels 101 or can be operated as a standalone machine. In one example, the round baler 100 uses an expandable baling chamber 102 which operates by utilizing at least one bale forming belt 104 routed around a series of rollers 106. The baler 100 includes a driving means 108, a pick-up device 110, a single or a plurality of belt tighteners 112, and a lift gate 114.

As material is picked up by the pick-up device 110 and deposited in the baling chamber 102 at an inlet 103, the material is compressed by the bale forming belt 104. Tension is maintained in the bale forming belt 104 by the series of belt tighteners 112 to ensure a properly compressed bale. Once a full bale 116 is formed, as shown in FIG. 2, material inflow ceased and a wrapping operation is commenced by a wrapping device 118. The wrapping device 118 is configured to apply a layer of wrap material 120 to the outer circumference of the completed bale 116. In some examples, the wrap material 120 is dispensed from a wrap material roll 122. In some examples, the wrap material roll 122 can have a diameter between about 4 inches and about 13 inches. In some examples, full wrapping rolls have a weight ranging between 60 to 100 pounds.

As schematically depicted, the baler 100 also includes a wrap material transfer device 115 that is configured to aid in transferring the wrap material roll 122 into, within, and out of the wrapping device 118. In some examples, the transfer device 115 is positioned within a wrap material bay 119 of the wrapping device 118. In some examples, the wrap material bay 119 is at least partially protected from the environment via a cover 126.

The wrap material 120 can be a variety of materials suitable for retaining the shape of the bale, protecting the bale, and for limiting exposure of the bale to moisture. Rope-like twine, knitted netwrap, plastic or fabric sheets, or film-type sheets are just some examples that are commonly used in the industry as wrap material 120. In some examples, the wrap material 120 is not twine (e.g., may be knitted netwrap, plastic or fabric sheets, or film-type sheets). Once the wrapping operation is completed, the operator ejects the full bale 116 from the baling chamber 102 by opening the lift gate 114. Further details relating to the baling operation within the baling chamber 102 can be found in U.S. Pat. No. 7,181,900, which is hereby incorporated by reference in its entirety.

FIGS. 3-7 show the wrapping device 118 mounted to a baler frame 121. In some examples, the wrapping device 118 is mounted to the lift gate 114 of the baler 100. In other examples, the wrapping device 118 is mounted to the baler frame 121 at an opposite end of the baler 100, for example, a front of the baler 100 near the driving means 108 (shown in FIGS. 8-10).

The wrapping device 118 is configured to provide a supply of wrap material 120 from a wrap material roll 122 to the baling chamber 102. Specifically, the wrapping device 118 includes a wrap material bay 119, a housing 124, the cover 126, a storage shelf 128, a wrap material spindle 130, and a wrap roll support post 131. As depicted, the transfer device 115 is mounted to the baler frame 121 and positioned within the wrap material bay 119. In some examples, the transfer device 115 is mounted to the baler frame 121 outside of the wrap material bay 119. The wrap material device is configured to receive a plurality of wrap material rolls 122.

The wrap material bay 119 is configured to store the components of the wrap material device 118. The housing 124 can be mounted to the baler 100. In some examples, the housing 124 is mounted to the lift gate 114 of the baler 100. The cover 126 is pivotable about the frame 121 to selectively give the operator access to the wrap material bay 119 of the wrapping device 118. The housing 124 can further define the storage shelf 128 for storing additional rolls 122 of the wrap material 120.

The wrap material spindle 130 is an extension that is configured to interface with, and selectively attach to, the wrap material roll 122 for dispensing wrap material 120 into the baling chamber 102. The wrap material spindle 130 is configured to be coupled to the wrap material roll 122.

The roll support post 131 is positioned opposite the spindle 130. The roll support post 131 is configured to be aligned with the spindle 130 and configured to support an opposite side of the wrap material roll 122 than the spindle 130.

The transfer device 115 allows the user to lift, lower, and transfer a bale wrap material roll 122 to, from, and within the wrap material bay 119. The transfer device 115 includes an arm 132 a pivot 134, and a lifting device 136.

Figure 3:
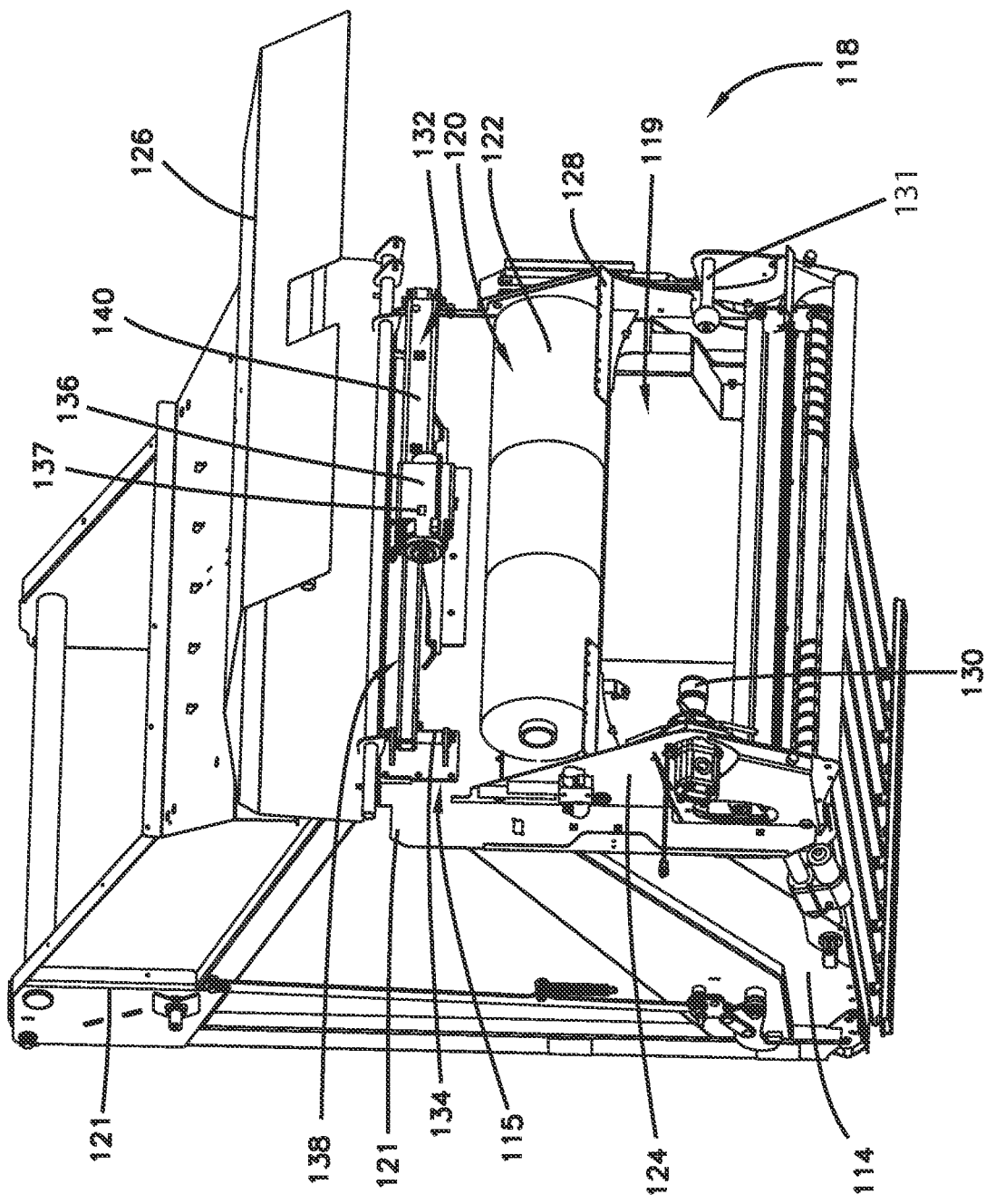
FIG. 3 is a perspective view of a wrapping device for a baler attached to a frame of a baler, according to one embodiment of the present disclosure.
Figure 4:
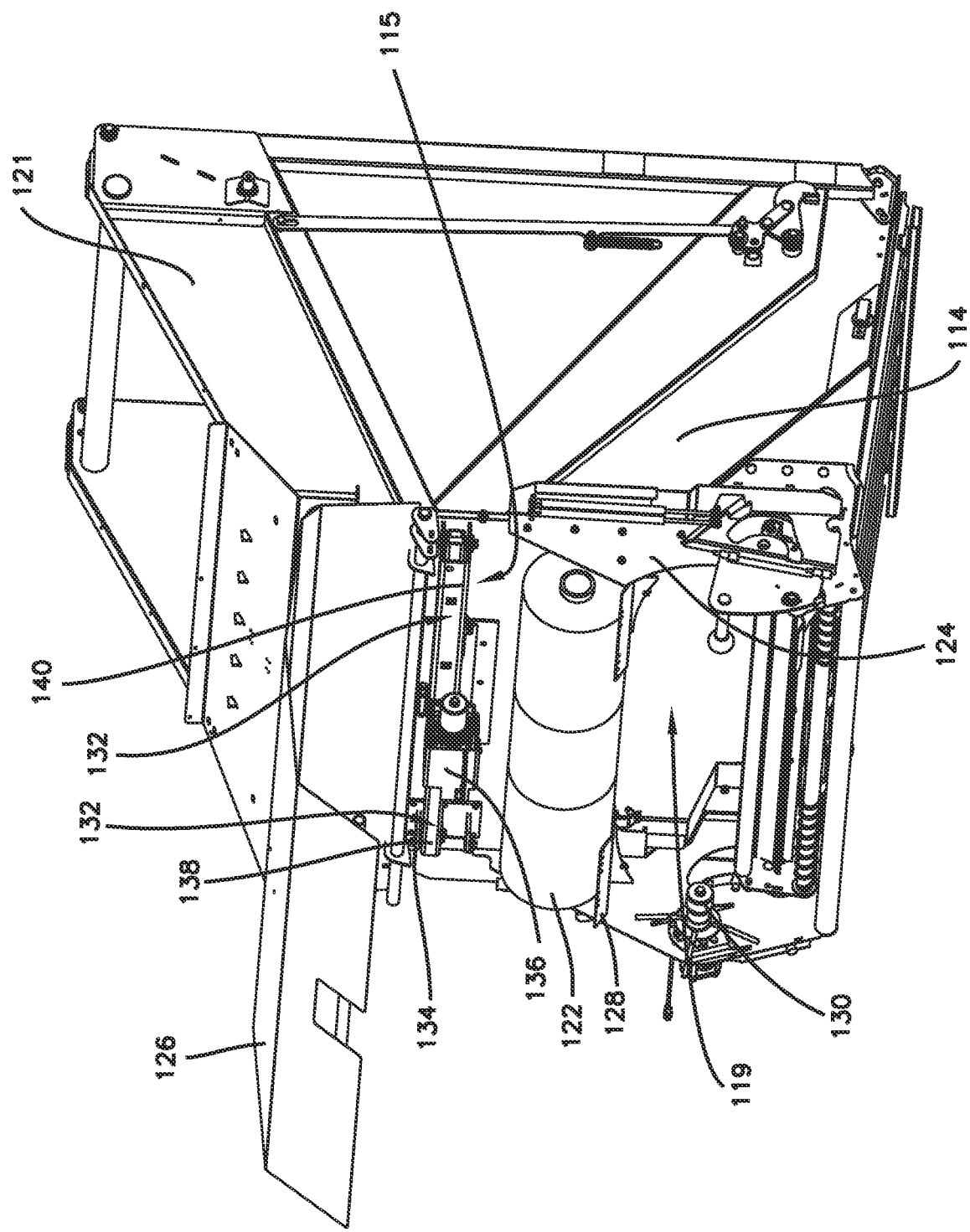
FIG. 4 is another perspective view of the wrapping device of FIG. 3.

The transfer device 115 is shown in a stored positioned within the wrap material bay 119 in FIGS. 3-4. In some examples, when in the stored position the transfer device 115 configured to be positioned above the shelf 128 and above the spindle 130 within the wrap material bay 119. However, it could be contemplated that the transfer device 115 can be positioned in a variety of other locations either within the wrap material bay 119 or outside of the wrap material bay 119. For example, the transfer device 115 can be mounted at any location on the baler 100 (e.g. on a front, a side, or a top of the baler) that allows the user to use the transfer device 115 to transfer wrap material rolls 122 to and from the wrapping device 118, regardless of the location of the wrapping device 118 on the baler 100.

The arm 132 includes a first end 138 and a second end 140. At the first end 138, the arm 132 is connected at the pivot 134 to the frame 121 of the baler 100. The lifting device 136 is also mounted to the arm 132. In some examples, the lifting device 136 is mounted at the second end 140 of the arm 132. In some examples, the lifting device 136 is positioned between the first and second ends 138, 140 of the arm 132. In other examples, the lifting device 136 is movably mounted to the arm 132 to allow the lifting device 136 to move between the first and second ends 138, 140 of the arm 132.

The pivot 134 is connected to the frame 121 and housing 124 of the wrapping device 118 to allow the arm 132 to be pivoted about the baler frame 121 and housing 124. In some examples, the pivot 134 is indirectly connected to the frame 121 (i.e. via an extension, mounting plate, or the like). Such pivoting allows the transfer device 115 to swing out away from the baler 100 to facilitate the transferring of wrap material rolls 122. In some examples, the pivot 134 allows the arm 132 to be swung to a side of the baler 100. In some examples, the pivot 134 allows the arm 132 to be pivoted about a single axis. In other examples, the pivot 134 allows the arm 132 to be pivoted and moved about multiple axes. In such examples, the pivot 134 can include a locking mechanism to lock the arm in a particular position with respect to the pivot 134. In other examples still, the arm 132 can be remotely moved about the pivot 134.

The lifting device 136 is configured to be coupled with a wrap material roll 122 to both lower and lift a wrap material roll 122. For example, the lifting device 136 can be attached to a wrap material roll 122 that is positioned at an external location to the baler 100 (e.g. in a truck bed, in a utility vehicle, on the ground etc.). The lifting device 136 can then be operated to lift the wrap material roll 122 from the external location to allow the user to position the roll 122 within the wrap material bay 119. For example, the user may use the lifting device 136 to lift a wrap material roll 122 to the storage shelf 128 or directly to the spindle 130. Alternatively, the user can use the lifting device 136 to lower a roll 122 from the shelf 128 to the spindle 130 or out of the wrap material bay 119.

In some examples, the lifting device 136 is electrically powered. In some examples, the lifting device 136 is a hoist. In some examples, the lifting device 136 includes an internal motor 137. In some examples, the lifting device 136 is a manually powered device such as a hand crank system, pulley system, block and tackle system, or the like.

Figure 5:
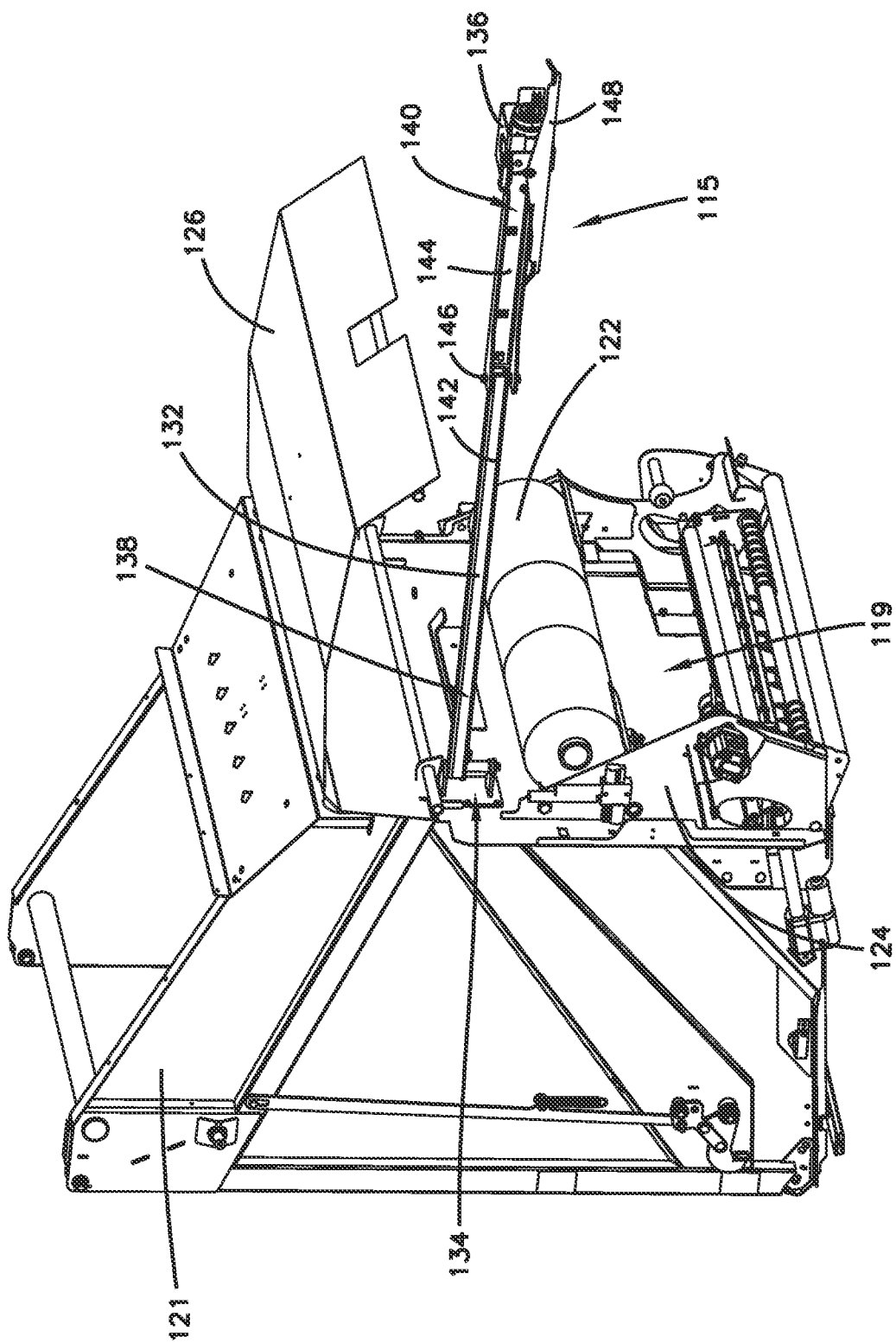
FIG. 5 is another perspective view of the wrapping device of FIG. 3 showing a wrap material transfer device in an operational position.
Figure 6:
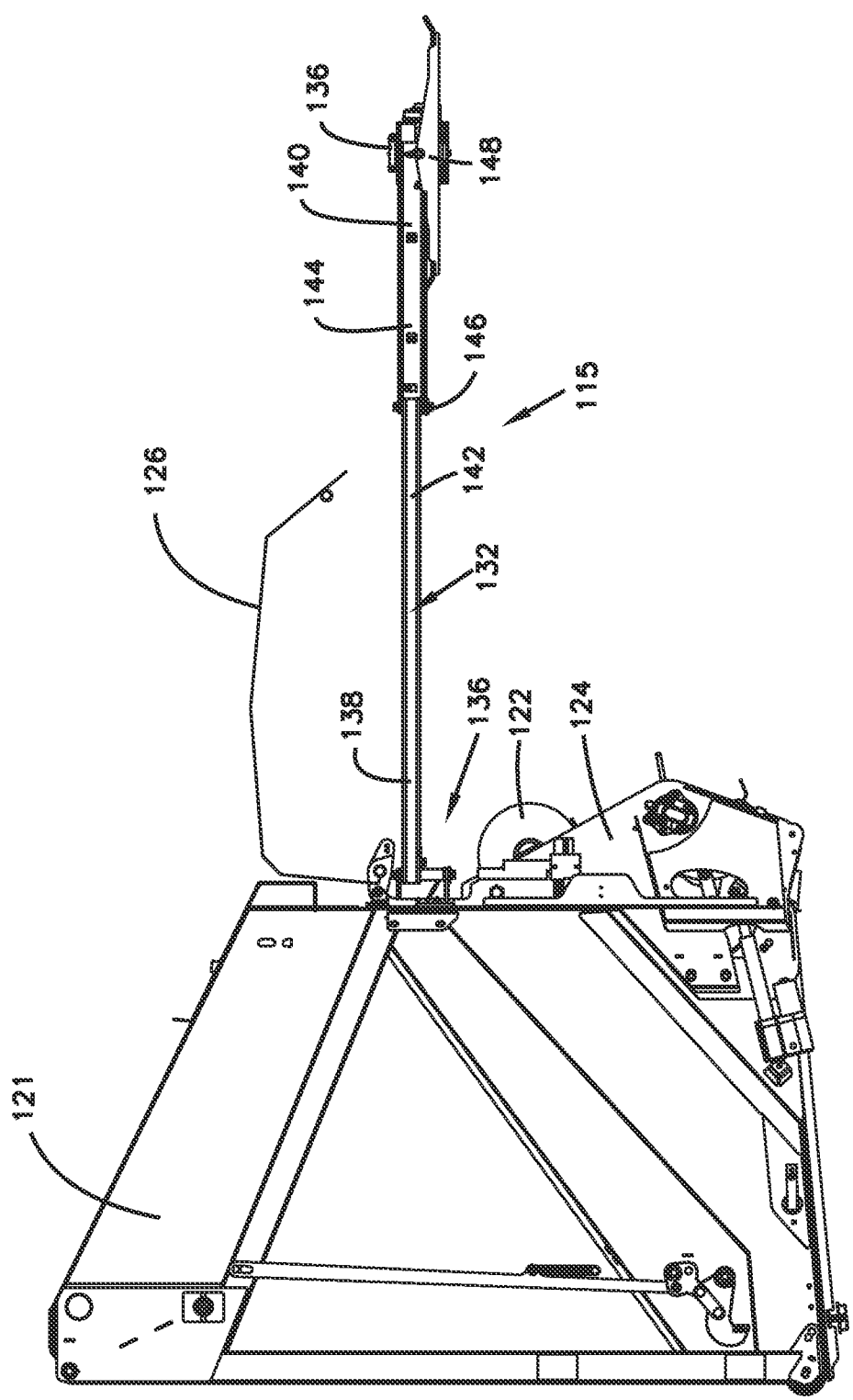
FIG. 6 is schematic side view of the wrapping device of FIG. 3 showing the wrap material transfer device in an operational position.
Figure 7:
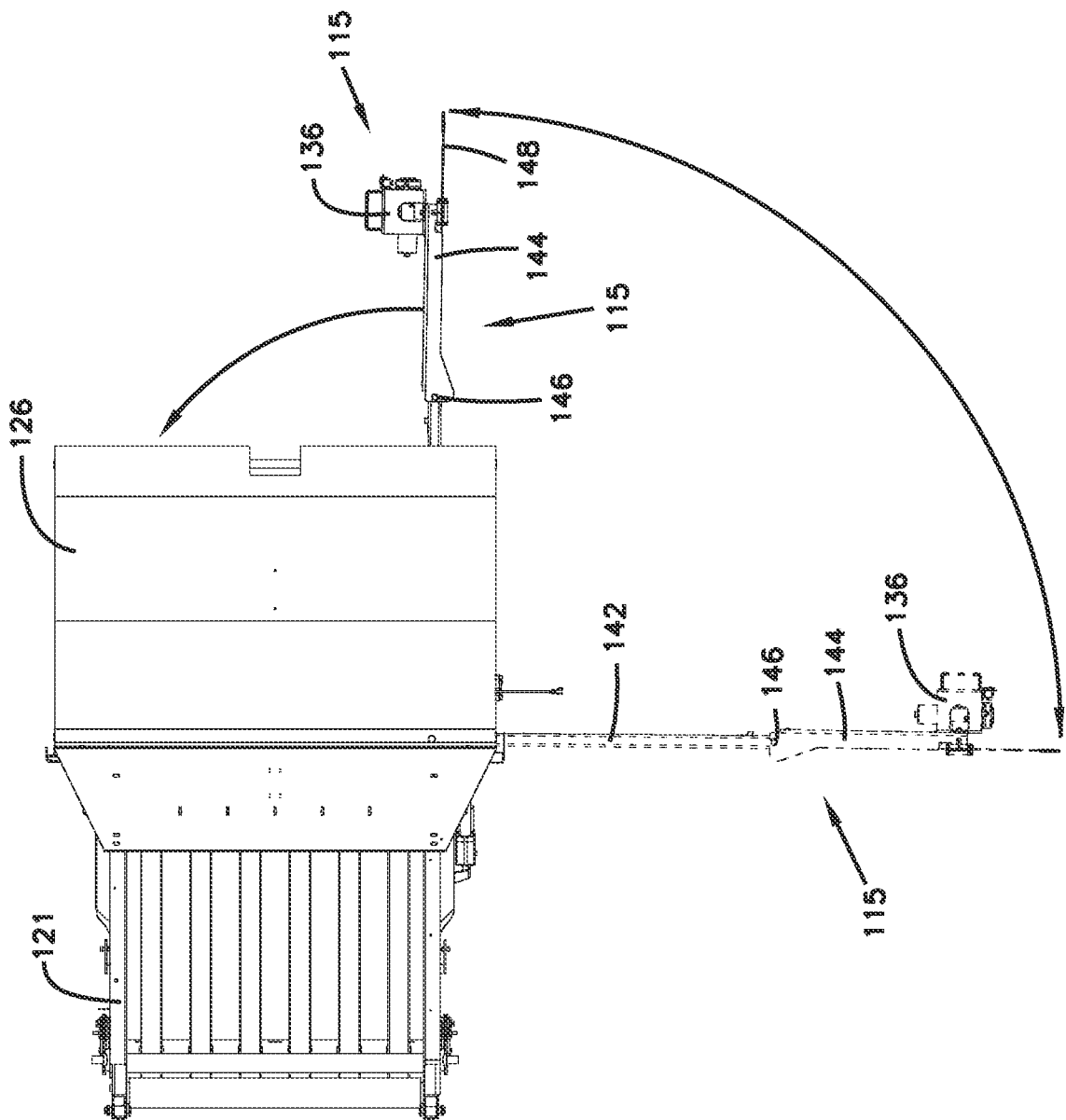
FIG. 7 is schematic top view of the wrapping device of FIG. 3 showing the wrap material transfer device in an operational position.

FIGS. 5-7 show the transfer device 115 in a variety of different operational positions. In the depicted examples, the transfer device 115 is shown pivoted away from the frame 121 and the wrapping device 118 via the pivot 134.

In the depicted example, the arm 132 includes multiple pieces. In some examples, the arm 132 can include a first member 142 and second member 144 pivotally attached to one another at an arm member pivot 146. In some examples, the first and second members 142, 144 are configured to be positioned in a stacked arrangement in the stored position so that the members 142, 144 are positioned longitudinally adjacent to one another to allow the arm 132 to have a compact stored length. In an operational position, the second member 144 can be rotated about an arm member pivot 146 to allow the second member 144 to be extended from the first member 142. Such pivoting about the arm member pivot 146 allows the arm 132 to have a range of extended operational lengths. In other examples, the arm 132 can have a telescopic construction.

In some examples, the pivot 134 allows the arm 132 about 180 degrees of pivoting freedom. In other examples, depending on the mounting configuration of the pivot 134, the pivot 134 can allow the arm 132 up to 360 degrees of pivoting freedom.

The transfer device 115 can also include a roll adapter 148 connected to the lifting device 136. In some examples, the roll adapter 148 is configured to interface with the wrap material roll 122 to stabilize the wrap material roll 122 when the roll 122 is being lifted or lowered. In some examples, the roll adapter 148 is a hook and/or fastening device. In other examples, the roll adapter 148 is a gambrel. In other example still, the roll adapter 148 is a sling.

During operation, the user can pivot the arm 132 from the stored position to an operational position. Accordingly, the user can pivot the arm 132 over an external location (a truck bed, in a utility vehicle, etc.), lower the roll adapter 148 from the arm 132 via the lifting device 136, attach the roll adapter 148 to a wrap material roll 122, lift the wrap material roll 122 via the lifting device 136 and roll adapter 148, and pivot the arm 132 in a way to allow the user to position the wrap material roll 122 that is suspended by the transfer device 115 into the wrap material bay 119.

Figure 8:
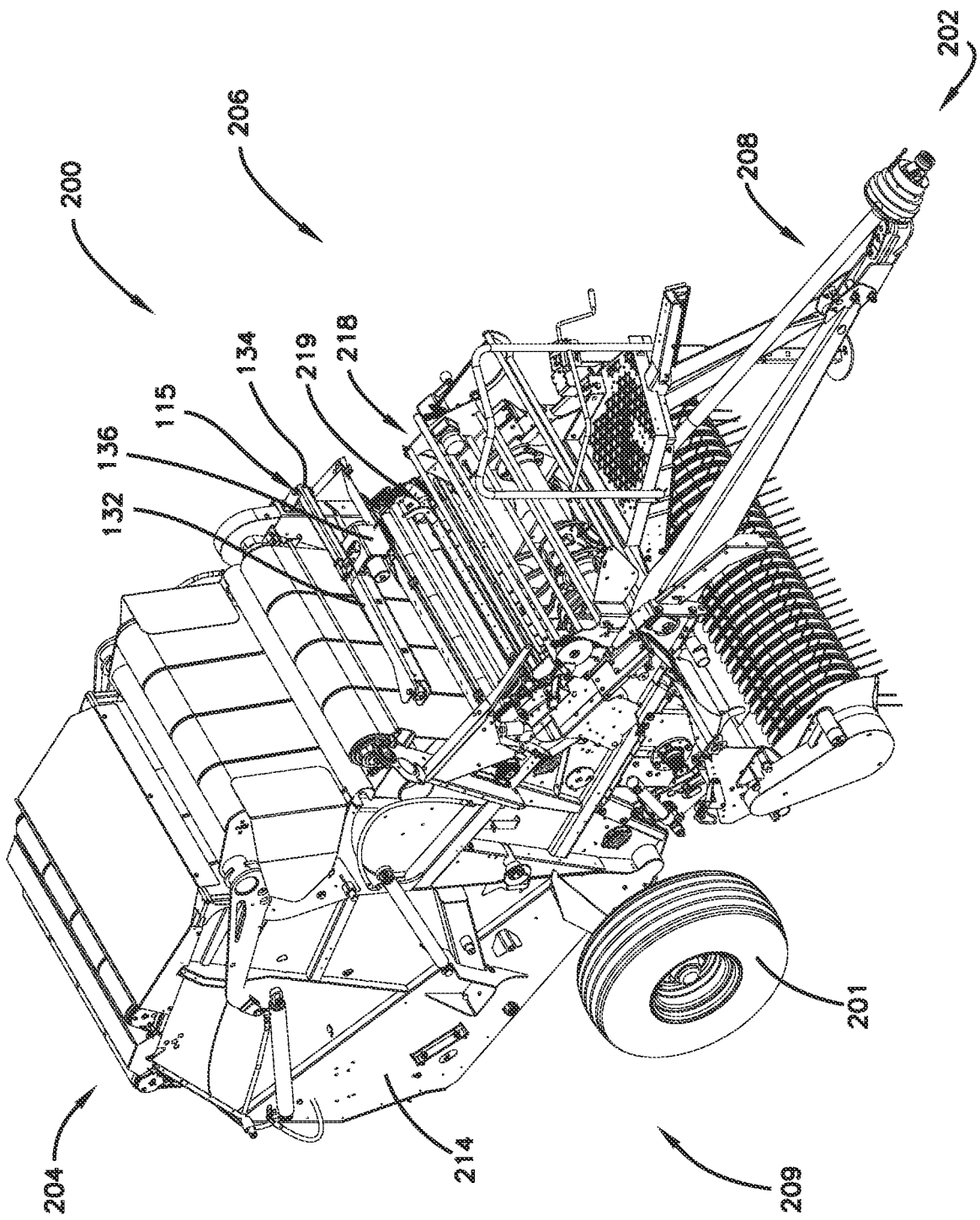
FIG. 8 is perspective view of the wrap material transfer device of FIG. 3 positioned at a front of a round baler in a stored position, according to one embodiment of the present disclosure.
Figure 9:
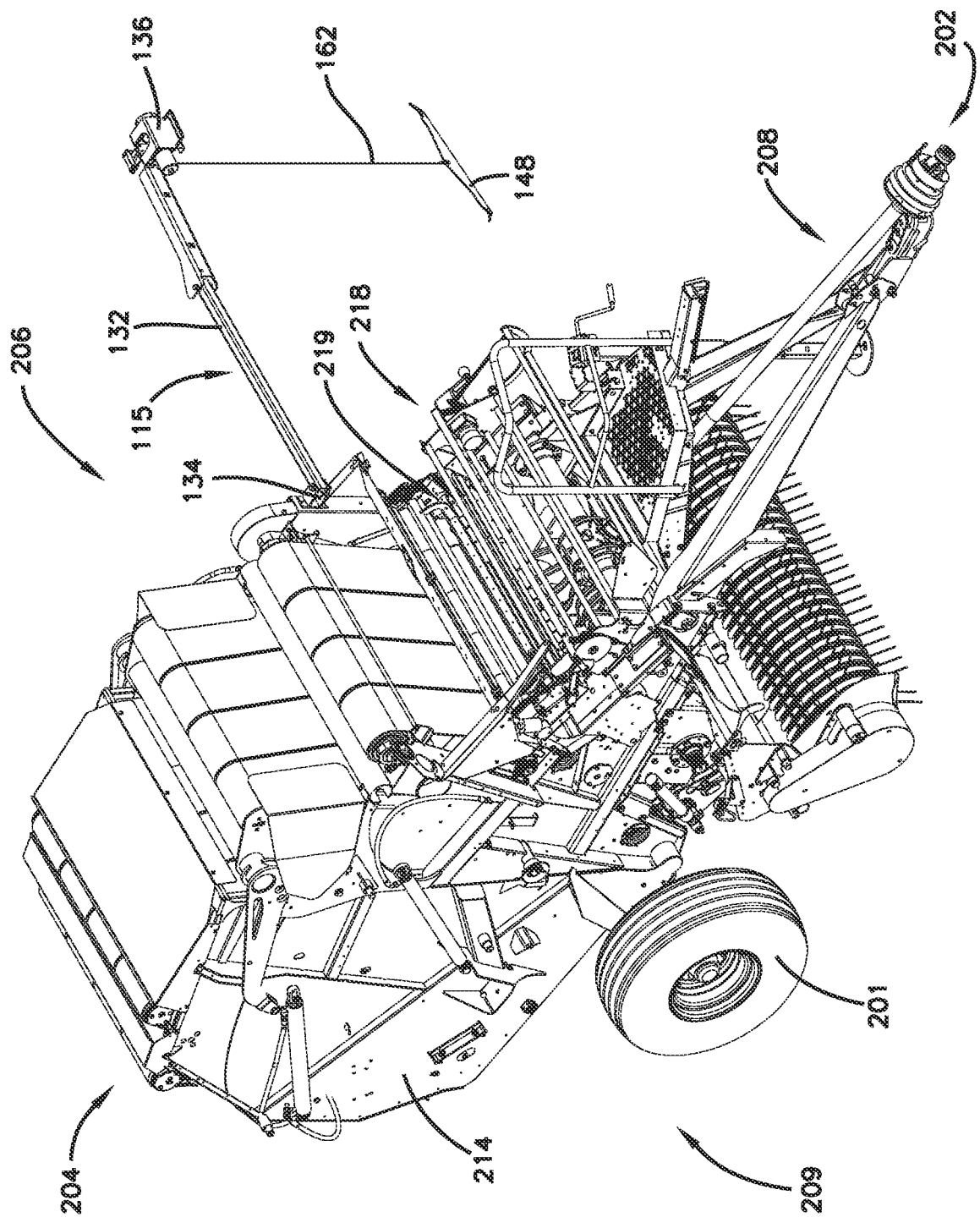
FIG. 9 is another perspective view of the baler of FIG. 8 with the wrap material transfer device in an operational position.
Figure 10:
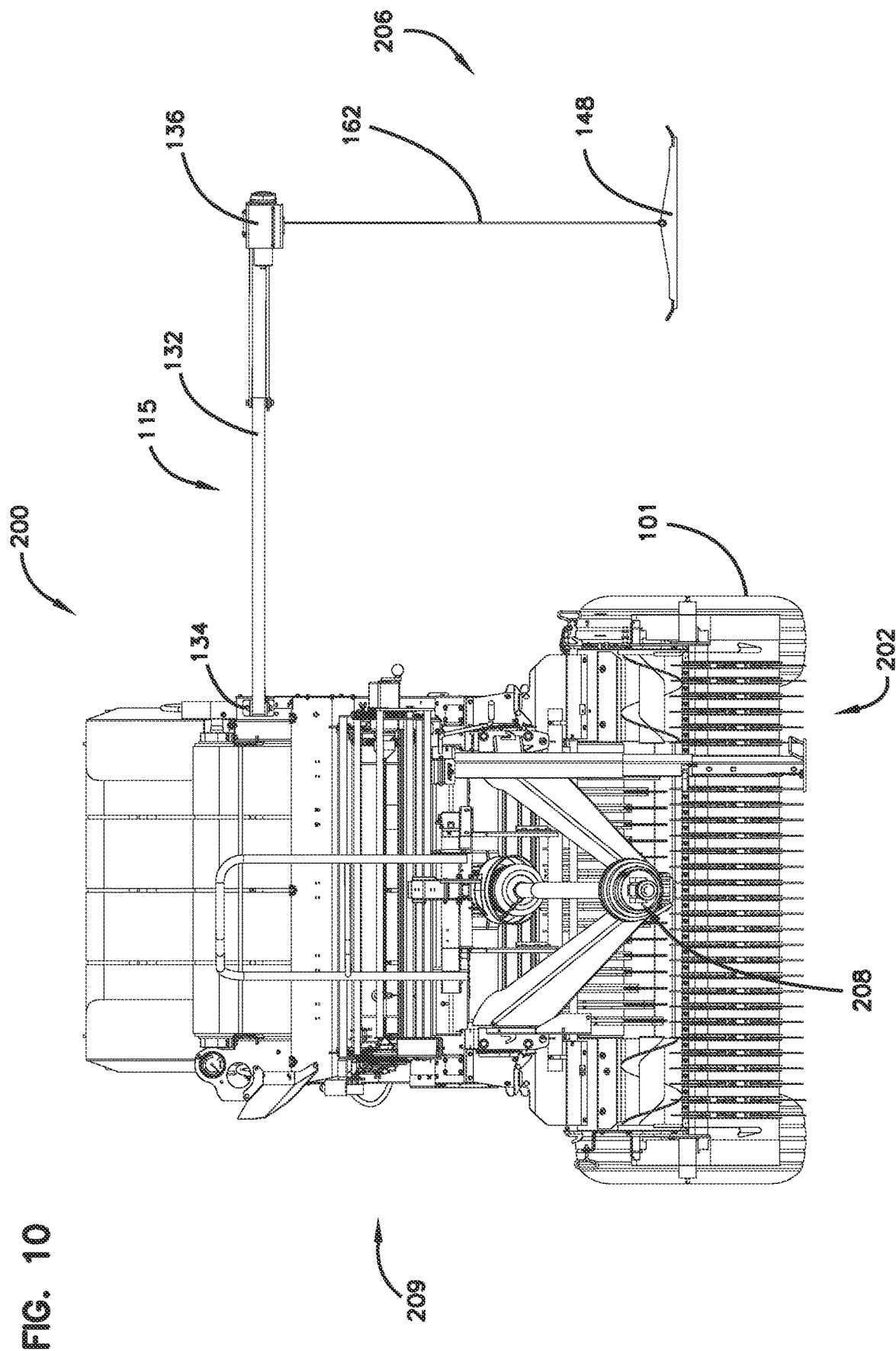
FIG. 10 is a front view of the baler of FIG. 8 with the wrap material transfer device in the operational position.

FIGS. 8-10 show a baler 200 with the transfer device 115. Like the baler 100 described above, the baler 200 can be towed behind a vehicle via wheels 201. The baler 200 has a front end 202 and a rear end 204. The baler 200 includes a driving means 208 at the front end 202 and a lift gate 214 at the rear end.

As shown, the transfer device 115 is positioned adjacent a wrapping device 218 positioned at the front end 202 of the baler 200. In some examples, a cover (similar to cover 126) can be positioned to at least partially protect a wrapping bay 219 of the wrapping device 218. In some examples, the transfer device 115 is under the cover.

The transfer device 115 allows the user to lift, lower, and transfer a bale wrap material roll 122 to, from, and within the wrap material bay 219 at the front end 202 of the baler 200. The transfer device 115 includes the arm 132, the pivot 134, the lifting device 136, and the roll adapter 148.

FIG. 8 shows the transfer device 115 in a stored position, adjacent the wrap material bay 219. FIGS. 9-10 show the transfer device 115 in an operational position, pivoted away from the baler 200 about the pivot 146, with the roll adapter 148 lowered from the arm 132 via a cable 162. As shown, the transfer device 115 is pivoted to a side 206 of the baler 200. However, it is considered within the scope of the present disclosure that the transfer device 115 can also be positioned on the baler 200 to allow the transfer device 115 to be pivoted to an opposite side 209, or to the front or rear ends 202, 204. In some examples, the arm 132 can pivot about 180 degrees. In other examples, depending on the mounting configuration of the pivot 134, the pivot 134 can allow the arm 132 up to 360 degrees of pivoting freedom.

Like above, when mounted to the front side 202 during operation, the user can pivot the arm 132 from the stored position to an operational position. Accordingly, the user can pivot the arm 132 over an external location (a truck bed, in a utility vehicle, etc.), lower the roll adapter 148 from the arm 132 via the lifting device 136, attach the roll adapter 148 to a wrap material roll 122, lift the wrap material roll 122 via the lifting device 136 and roll adapter 148, and pivot the arm 132 in a way to allow the user to position the wrap material roll 122 that is suspended by the transfer device 115 into the wrap material bay 219.

FIGS. 11-15 show a baler 100 with a transfer device 315. The transfer device 315 is substantially similar to the transfer device 115, described above. The transfer device 315 allows the user to lift, lower, and transfer a bale wrap material roll 122 to, from, and within the wrap material bay 119. The transfer device 315 includes an arm 332 a pair of pivots 334, 335, a lifting actuator 337, and a roll adapter 348.

Figure 11:
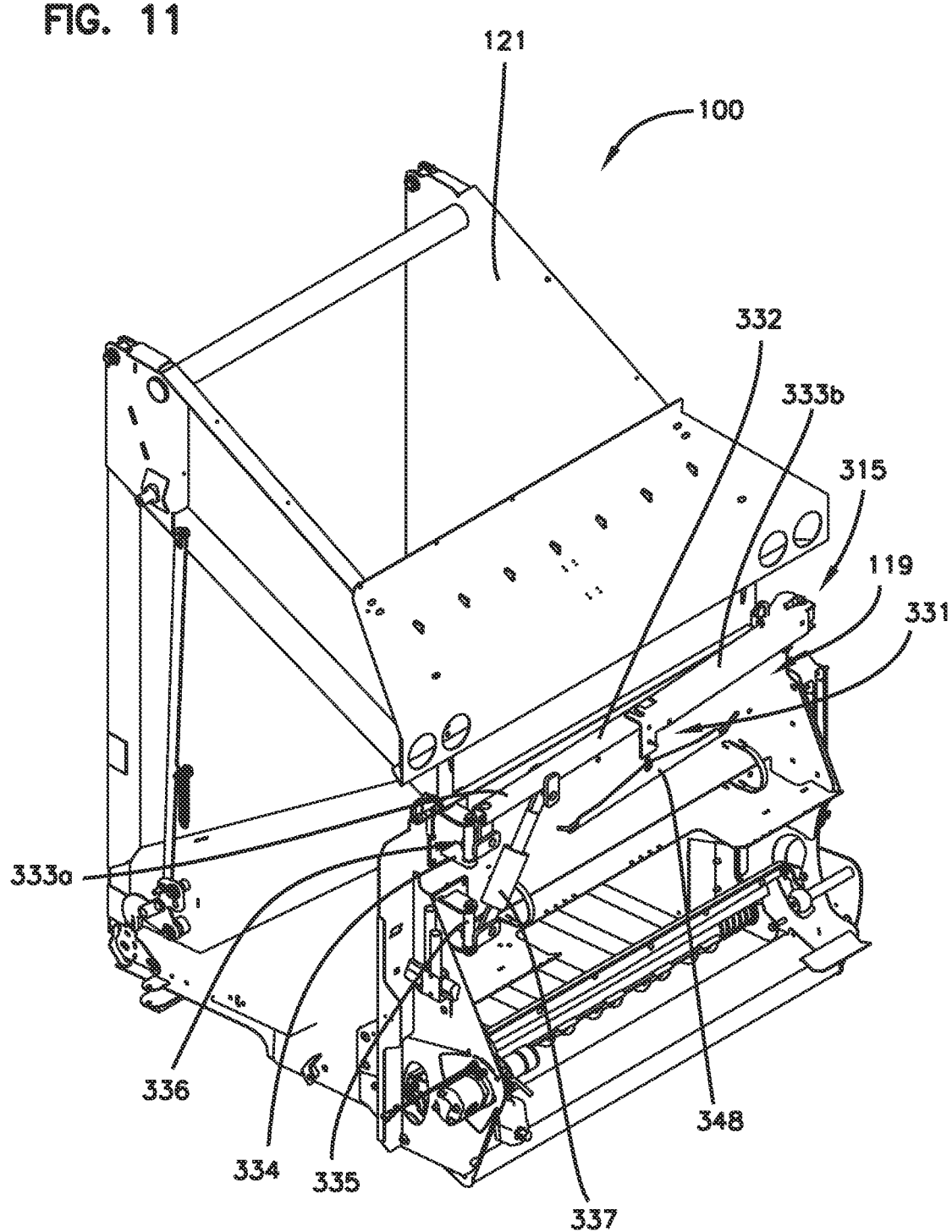
FIG. 11 is a perspective view of a wrap material transfer device for a baler, in a stored position, according to one embodiment of the present disclosure.
Figure 12:
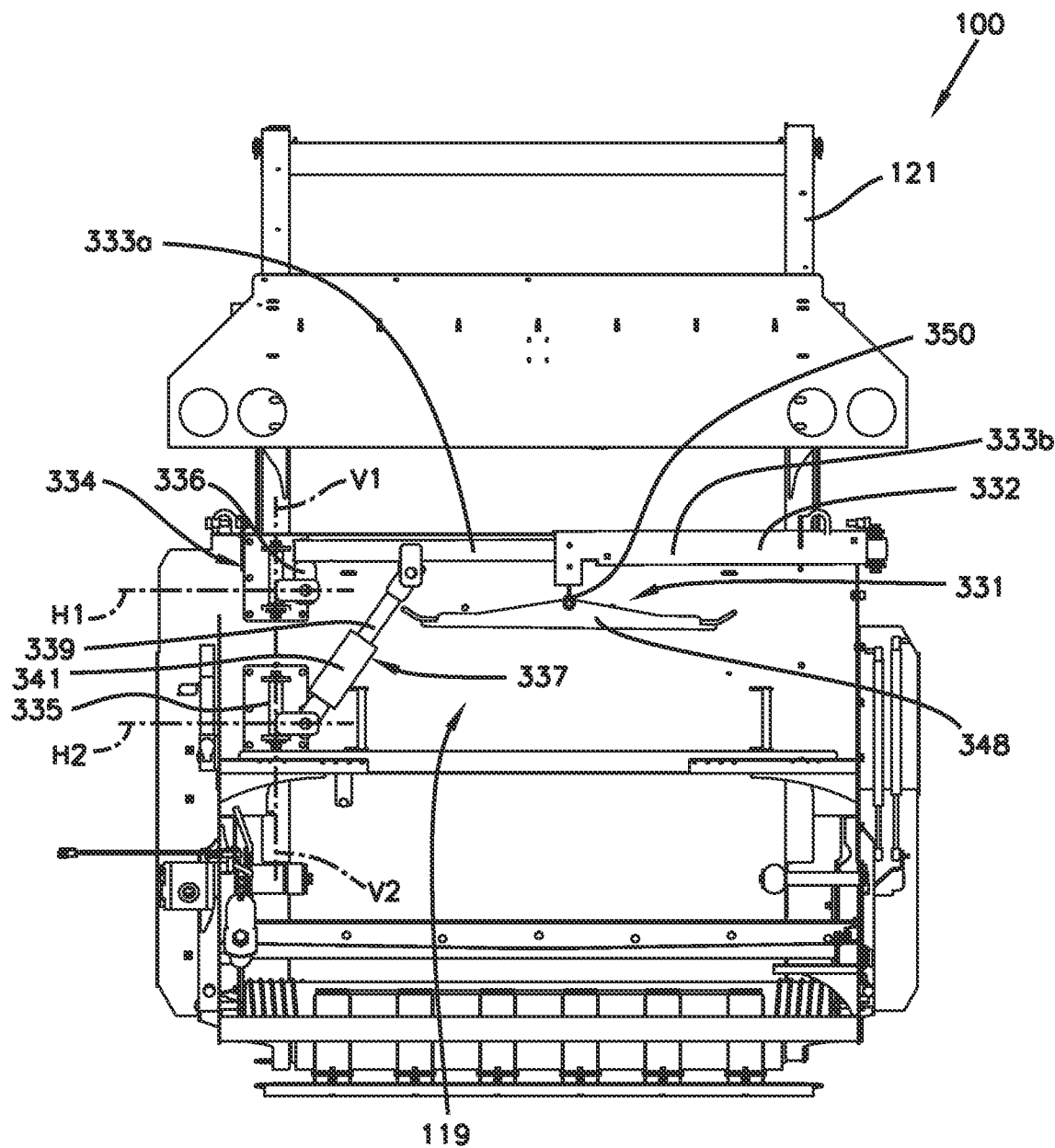
FIG. 12 is rear view of the baler of FIG. 11 with the wrap material transfer device in a stored position.
Figure 13:
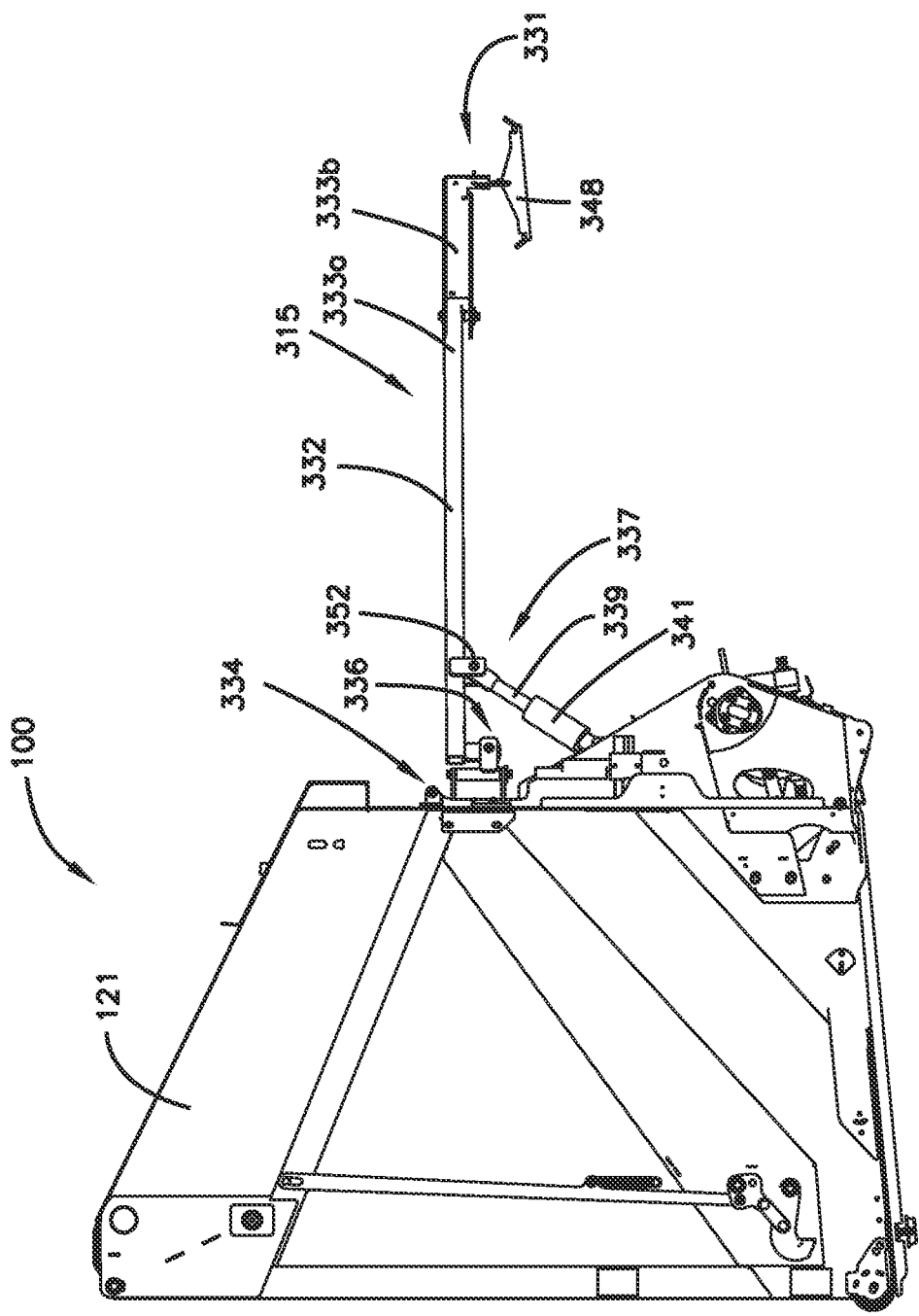
FIG. 13 is a side view of the baler of FIG. 11 with the wrap material transfer device in the operational position.
Figure 14:
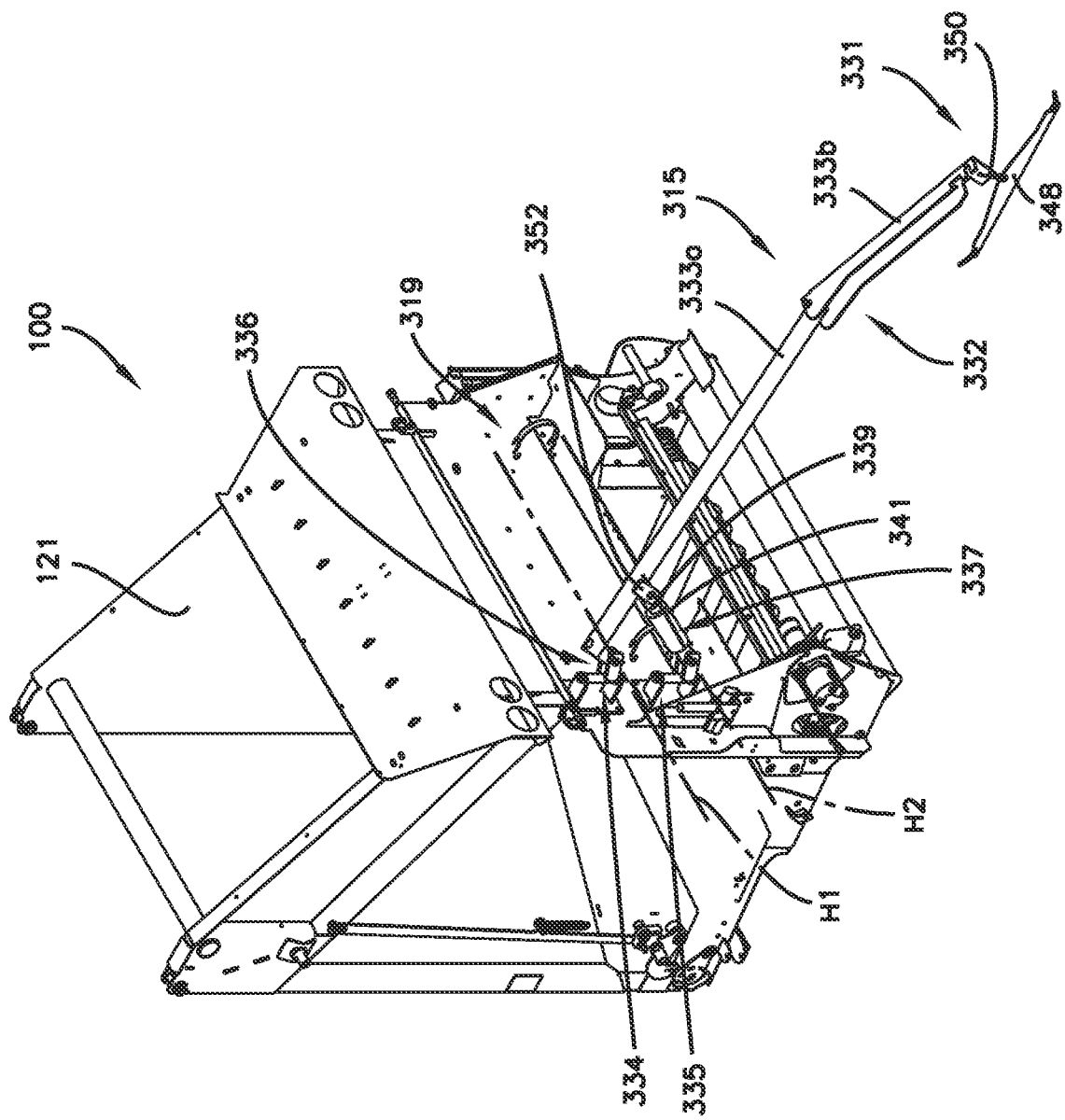
FIG. 14 is another perspective view of the baler of FIG. 11, with the wrap device in the operational position.
Figure 15:
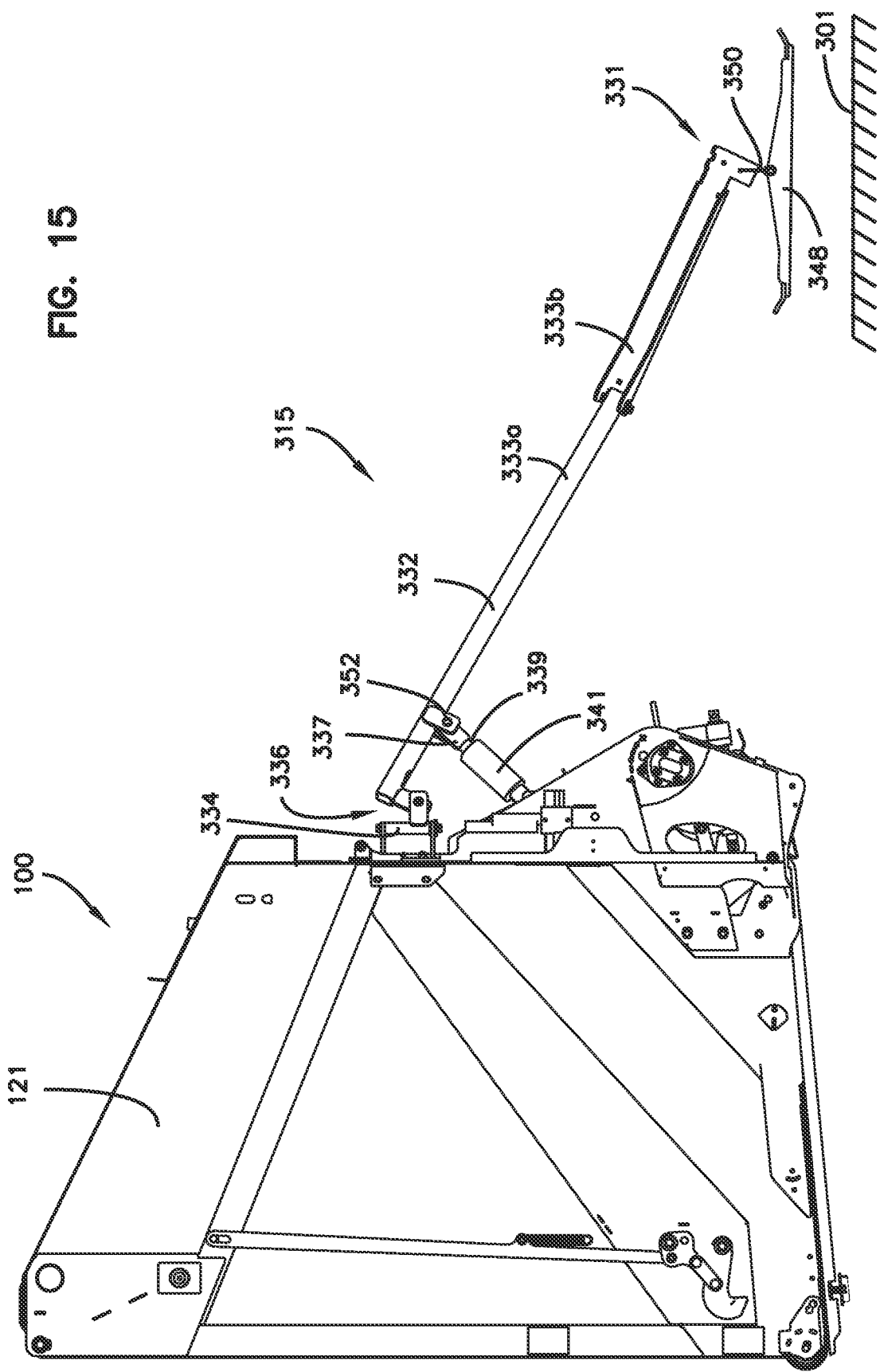
FIG. 15 is another side view of the baler of FIG. 11 with the wrap material transfer device in the operational position.

The transfer device 315 is shown in a stored positioned within the wrap material bay 119 in FIGS. 11-12. FIGS. 13-15 show the transfer device 315 in a variety of different operational positions. In the depicted examples, the transfer device 315 is shown pivoted away from the frame 121 and the wrapping device 118 via the pivots 334, 335 when in an operational position. The transfer device 315 can pivot both horizontally and vertically about the frame 121 of the baler 100 to facilitate a wide range of motion. Such movement is made possible by the pivots 334, 335 and the lifting actuator 337.

As shown, because the transfer device 315 can be pivoted vertically with respect to the baler 100, the transfer device 315 can be operated without the need for a lifting device that extends from the arm 332 (e.g., a hoist or similar device). As shown, a lifting device 331 of the transfer device 315 includes the roll adapter 348 attached to the arm 332 via a pivot 350. In some examples, the transfer device 315 can pivot to be configured to pick up a wrap material roll 122 from a ground surface or a secondary surface, such as a truck bed. In some examples, the transfer device 315 can include a lifting device (substantially similar to the lifting device 136, above) that extends from the arm 332 (i.e., a hoist).

The arm 332 can be substantially similar to arm 132, described above. In some examples, the arm 332 can include multiple members 333a, 333b, each being moveable with respect to one another. Further, in some examples, the arm members 333a, 333b can be configured so that, when the transfer device 315 is in the stored position, the arm 332 stores in a compact manor. In some examples, the arm members 333a, 333b can nest with one another when in the stored position.

The pivot 334 is connected to the arm 332 via a joint 336 and also connected to the frame 121 of the baler 100. In some examples, the joint 336 can have multiple pivot axes. In some examples, as shown in FIG. 12, the arm 332 moves about the pivot 334 around a vertical axis V1. In the depicted example, the arm 332 can also move about the pivot 334 about a horizontal axis H1. The horizontal pivot axis H1 is generally transverse to the vertical pivot axis V1.

The pivot 335 is connected the lifting actuator 337 and to the frame 121 of the baler 100. In some examples, the pivot 335 can be substantially similar to the pivot 334. Similar to pivot 334, pivot 335 allows the lifting actuator 337 to move about a vertical axis V2 and a horizontal axis H2. In some examples, the horizontal axis H2 is aligned with the horizontal axis H1 of the pivot 334. The horizontal pivot axis H2 is generally transverse to the vertical pivot axis V2.

The roll adapter 348 is substantially similar to the roll adapter 148 disclosed above. The roll adapter 348 is configured to be attached to a wrap material roll 122 so that the transfer device 315 can move the wrap material roll 122. In some examples, the roll adapter 348 is attached to the arm 332 via the pivot 350 to allow the roll adapter 348 to pivot about the arm 332. In some examples, the roll adapter 348 cannot extend away from the arm 332.

The lifting actuator 337 is pivotally connected to the pivot 335 and the arm 332. In some examples, the lifting actuator 337 is connected to the arm 332 at an arm joint 352 and to the pivot 335 at a lifting actuator joint 354. In some examples, the joints 352, 354 allow for multi-axis pivotal movement of the lifting actuator 337 with respect to the pivot 335 and the arm 332. In some examples, the lifting actuator 337 is a hydraulic cylinder. In other examples, the lifting actuator 337 is a pneumatic cylinder (e.g., gas piston, air filled, etc.). In other examples still, the lifting actuator 337 can be a mechanical actuator including a spring. The lifting actuator 337 assists in the lifting the arm 332 when the arm 332 is pivoted about the horizontal axis H1 with respect to the baler 100. The lifting actuator can reduce the amount of input force required by an operator on the arm 332 to lift the arm 332 from a lowered, second position (shown in FIGS. 14-15) to a first, raised position (shown in FIGS. 11-13). In some examples, the lifting actuator 337 can be powered. In some examples, the lifting actuator 337 can be a hydraulic cylinder powered by a pump, either in communication with the baler hydraulic system or a stand-alone system. In other examples, the lifting actuator 337 can be a pneumatic cylinder powered by a compressor. It is contemplated that, and considered to be within the scope of the present disclosure, the lifting actuator 337 can have a variety of different configurations to achieve assisted lifting of the arm 332.

As shown, the lifting actuator 337 has a rod 339 and a cylinder 341. As the arm 332 and lifting actuator 337 are pivoted about the vertical axes V1 and V2, the lifting actuator 337 can be configured to hold the arm 332 in the first, raised position until a vertical force is exerted on the arm 332. In some examples, this first, raised position can be a horizontal position that the arm 332 is in when stored, as shown in FIGS. 11-13. In some examples, sans a vertical enacted force on the arm 332, as the arm 332 is pivoted away from the baler 100, the arm 332 stays in the same general position, by way of the lifting actuator 337, as shown in FIG. 13.

As shown in FIGS. 14 and 15, when the arm 332 is pivoted downward toward a pick-up surface 301, the arm 332 pivots about the horizontal axis H1 via the joint 336 on the pivot 334. As the arm 332 is moved, the lifting actuator 337 compresses and the rod 339 travels into the cylinder 341. Further, the lifting actuator 337 pivots about the arm 332 via the arm joint 352 and moves about the horizontal axis H2 via the pivot 335.

In some examples, a wrap material roll 122 may be located on the pick-up surface 301, and the transfer device 315 can be moved and pivoted so that the roll adapter 348 can be coupled with the wrap material roll 122. Once coupled, the operator can lift the arm 332, assisted by the lifting actuator 337 so that the rod 339 extends from the cylinder 341, to raise the wrap material roll 122 from the pick-up surface 301. The operator can then manipulate the arm 332 to positon the wrap material roll 122 within the wrap material bay 119.

Figure 16:
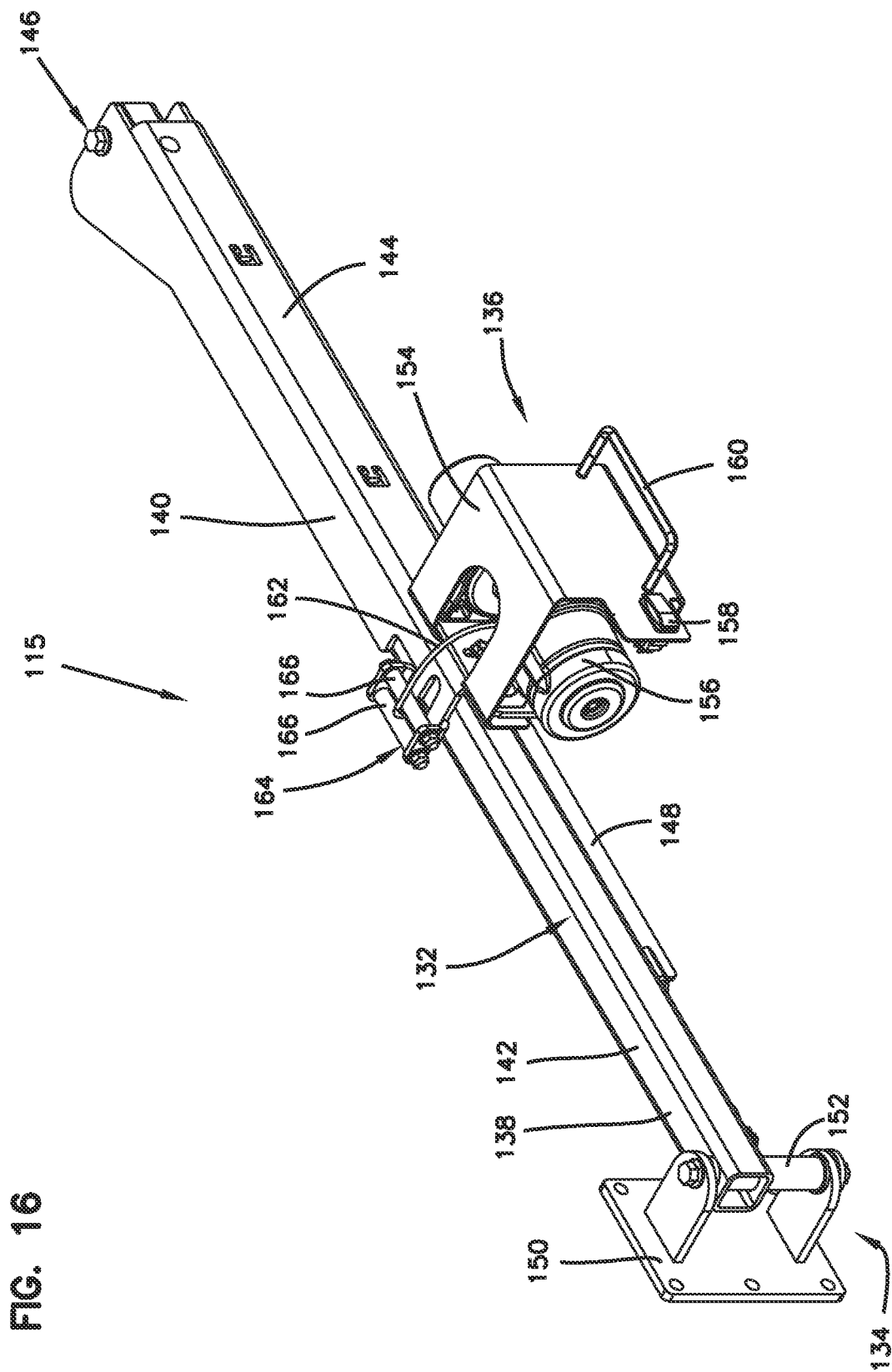
FIG. 16 is perspective view of a wrap material transfer device for a baler in a stored position, according to one embodiment of the present disclosure.
Figure 17:
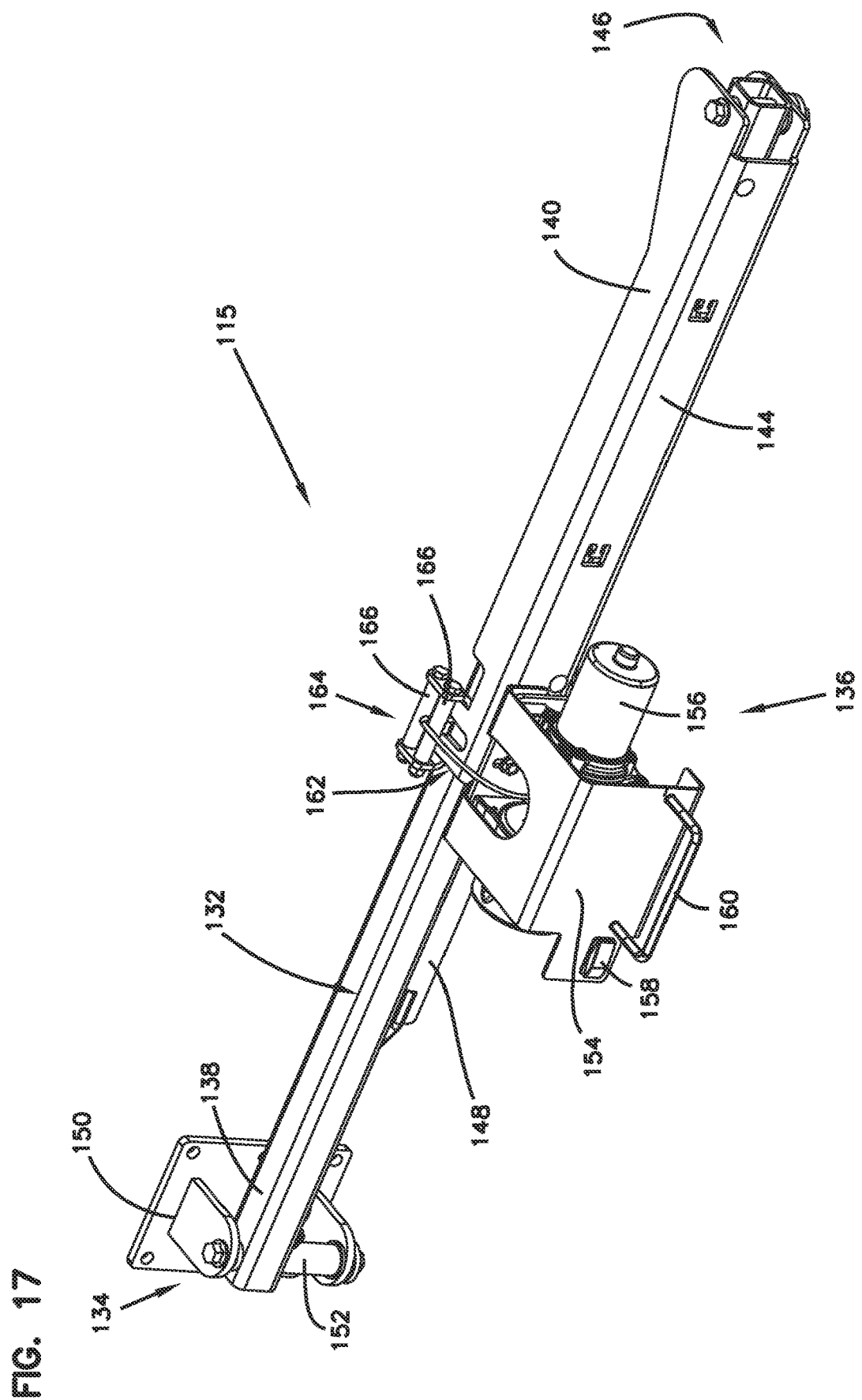
FIG. 17 is another perspective view of the wrap material transfer device of FIG. 16.
Figure 18:
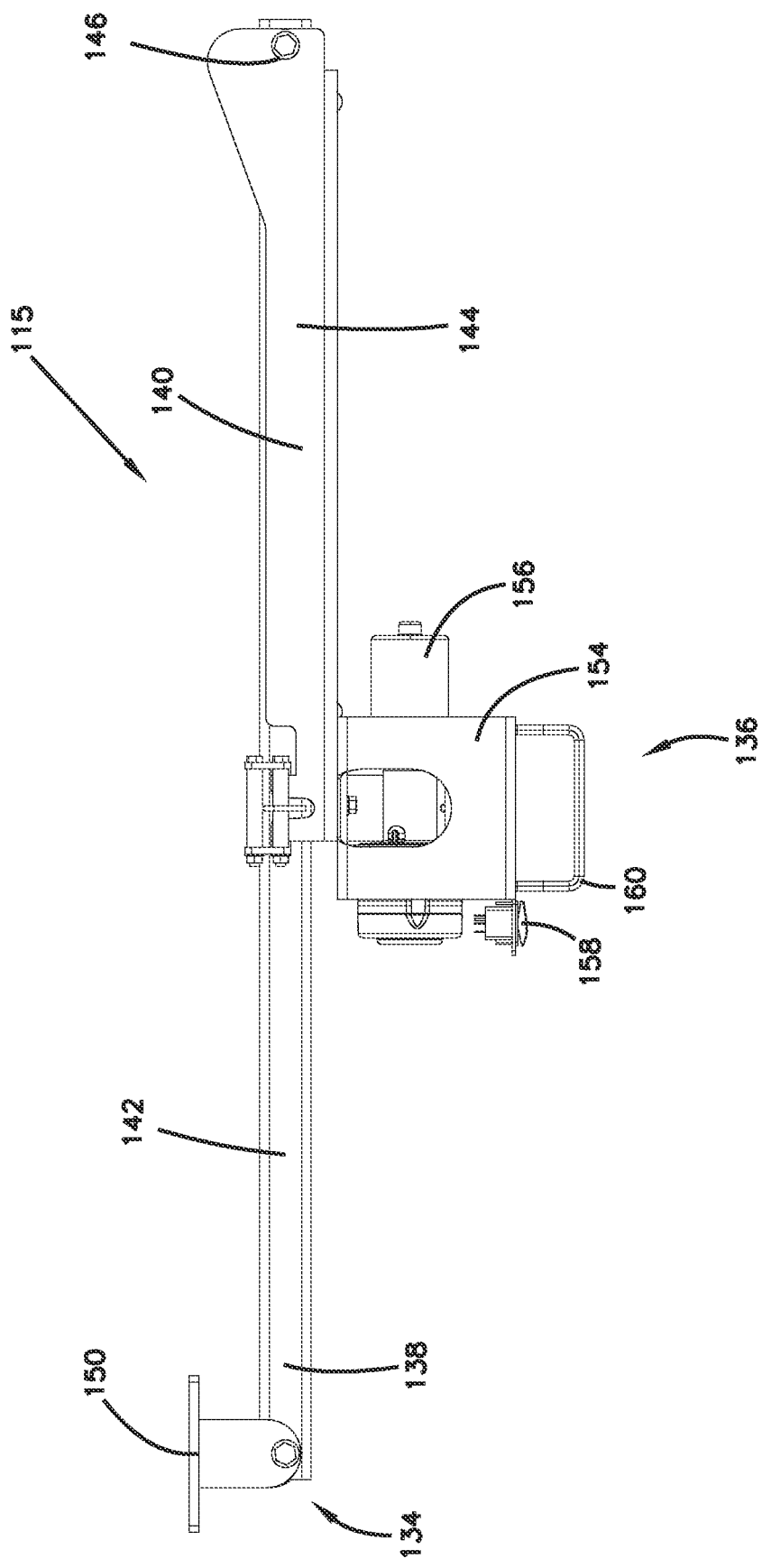
FIG. 18 is top view of the wrap material transfer device of FIG. 16.

FIGS. 16-18 show perspective views of the transfer device 115 in the stored position.

As shown, the second member 144 of the arm 132 is positioned at least partially around the first member 142 when in the stored position. In some examples, the second member 144 is positioned next too, but not around the first member 142.

The pivot 134 is shown to include a mounting flange 150 that is configured to be connected to the baler frame 121, either directly or indirectly. Further, the pivot 134 includes a pivot bar 152, of which the first member 142 of the arm 132 is positioned around.

The lifting device 136 is shown to include a housing 154 that at least partially surrounds a main body 156 of the lifting device 136. In some examples, the main body 156 of the lifting device 136 is a hoist motor and a hoist spool. The housing 154 also includes a lifting device control 158 and a maneuvering handle 160. In some examples, the lifting device control 158 toggles the lifting device 136 on and off. The maneuvering handle 160 provides the user a grasping location on the transfer device 115 to facilitate pivoting and positioning the transfer device 115 during operation.

Figure 19:
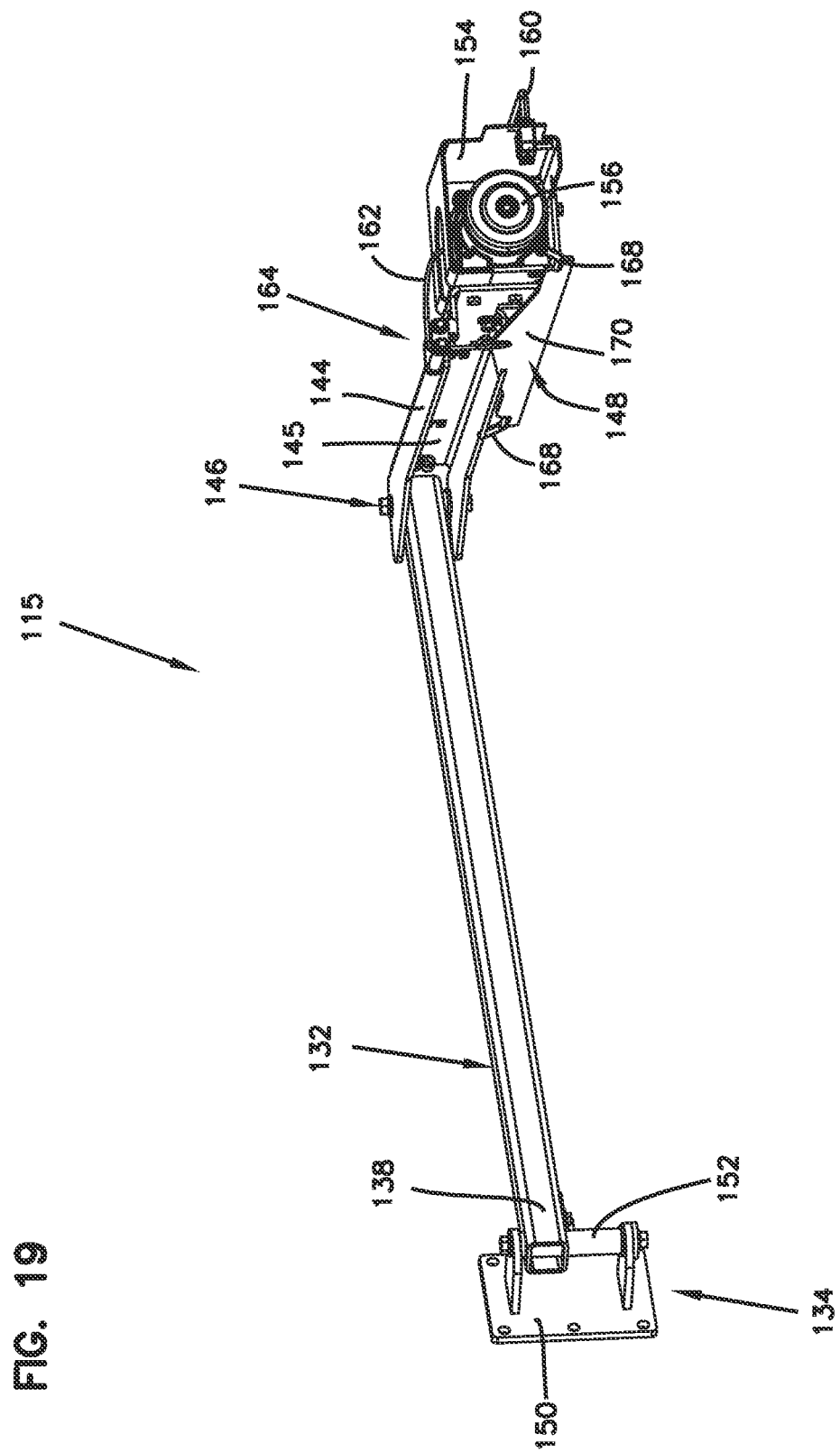
FIG. 19 is a perspective view of the wrap material transfer device of FIG. 16 in an operational position.
Figure 20:
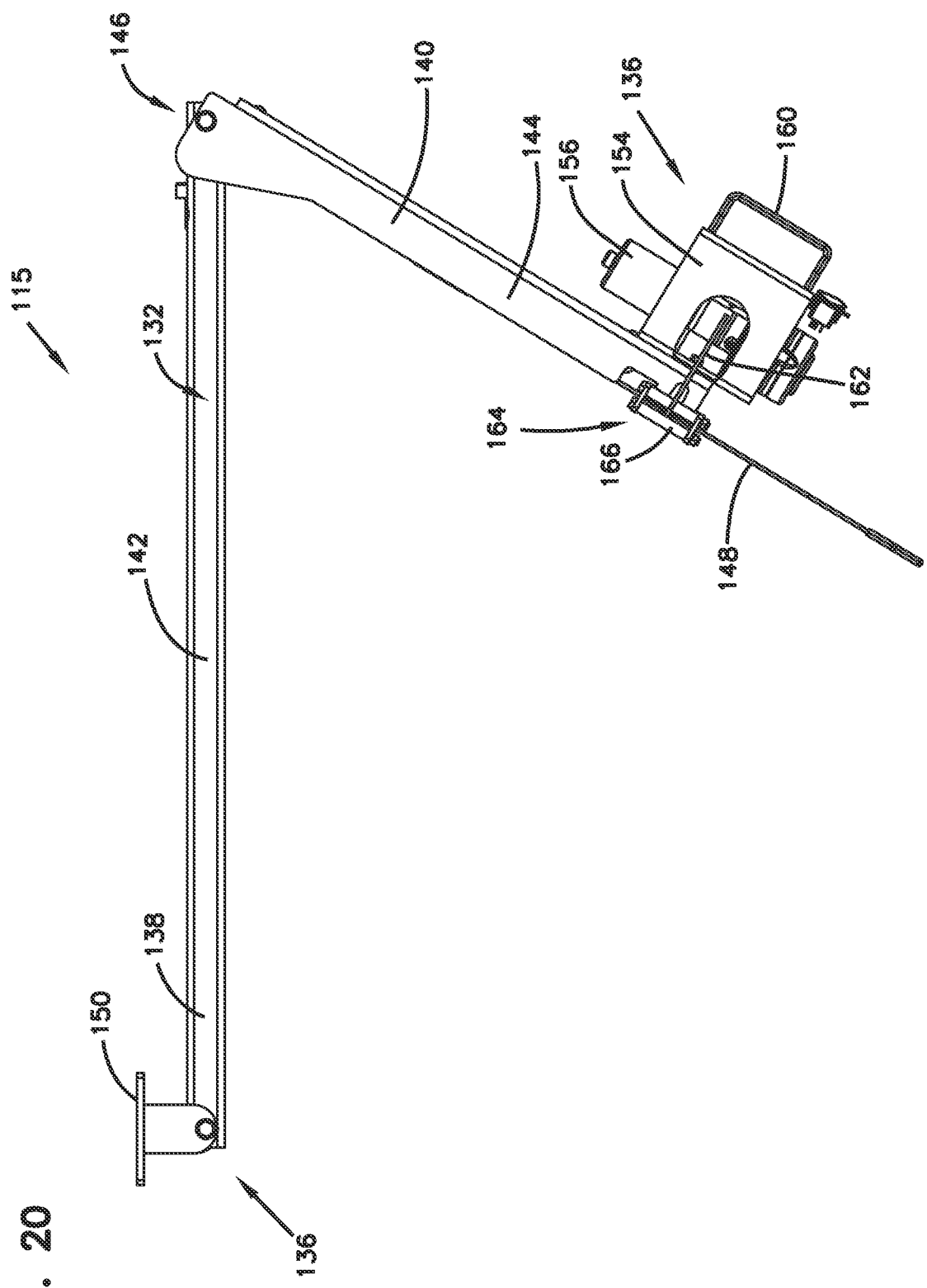
FIG. 20 is a top view of the wrap material transfer device of FIG. 16 in an operational position.

FIGS. 19-20 show the transfer device 115 in an operational position. The second member 144 of the arm 132 is shown to include a channel 145 that is sized and shaped to receive the first member 142 when the transfer device 115 is in the stored position. In some examples, the channel 145 can have a c-shaped transverse cross-section.

As shown, the roll adapter 148 is attached to the lifting device 136. Specifically, the roll adapter 148 is attached to the cable 162 that is routed through a cable guide 164. The cable guide can be attached to the arm 132 and/or the housing 154 of the lifting device 136. The guide 164 includes rounded surfaces 166 to minimize strain on the cable 162.

The roll adapter 148 includes pair of hooks 168 that are configured to interface with loop devices (not shown) that are positioned around a wrap material roll 122. The roll adapter 148 is configured to have a rigid main body 170 of which the hooks 168 are attached. The roll adapter 148 can be configured in a variety of ways. For examples, the roll adapter 148 can include straps, clamps, prongs, or other like feature that allows the roll adapter 148 to be coupled to a wrap material roll 122.

Figure 21:
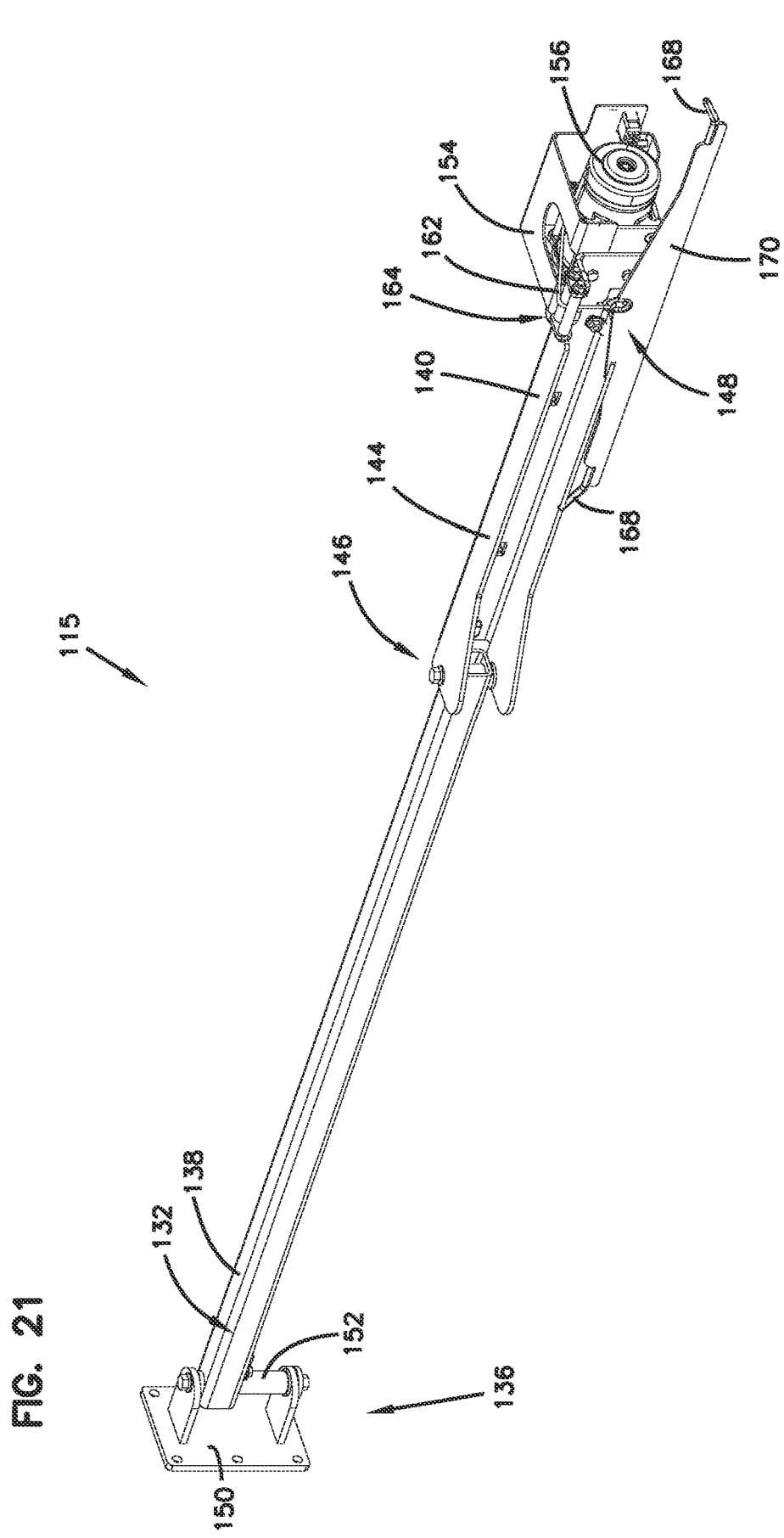
FIG. 21 is a perspective view of the wrap material transfer device of FIG. 16 in another operational position.
Figure 22:
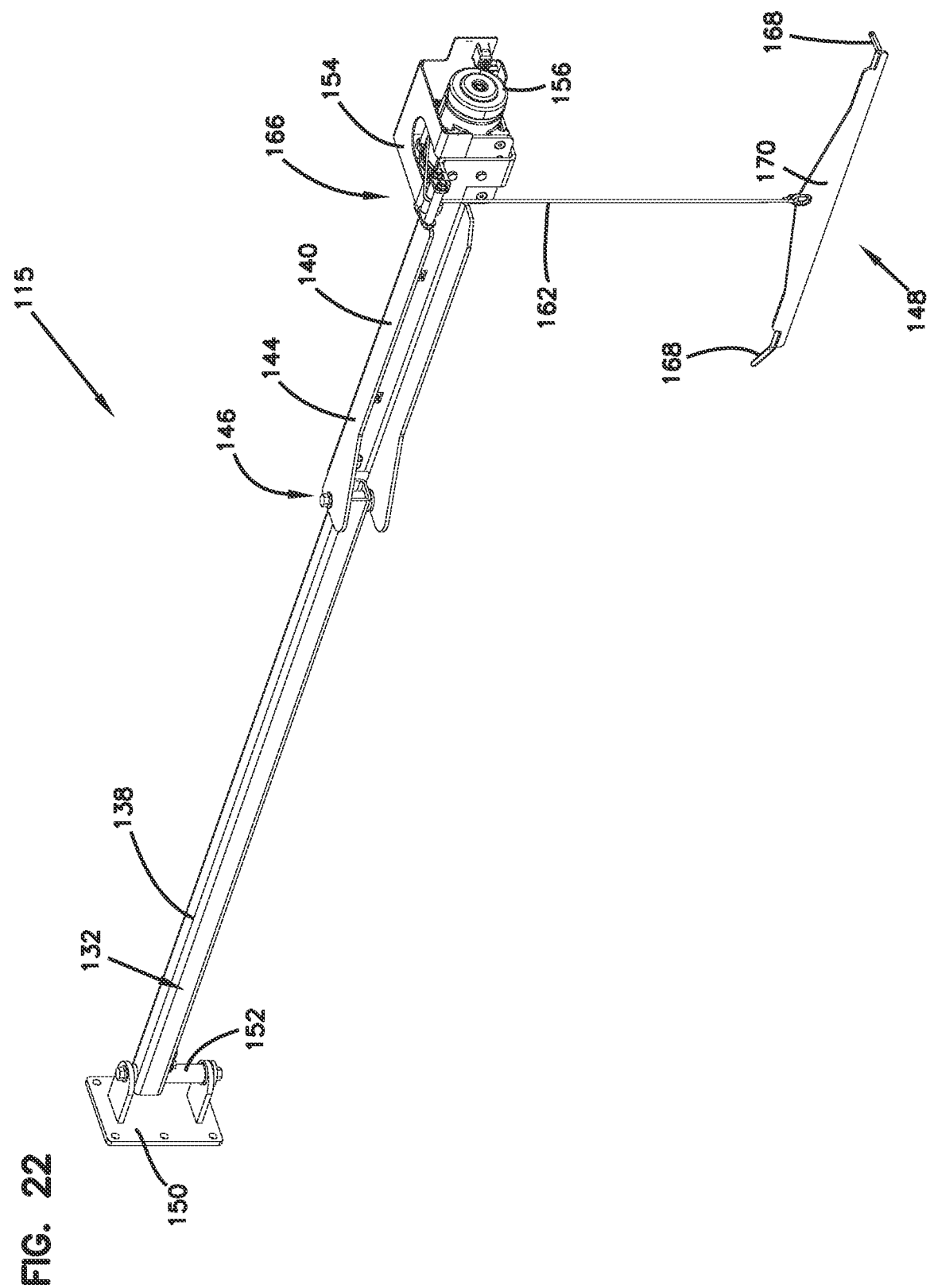
FIG. 22 is a perspective view of the wrap material transfer device of FIG. 16 in an operational position with a roll adapter extended therefrom.
Figure 23:
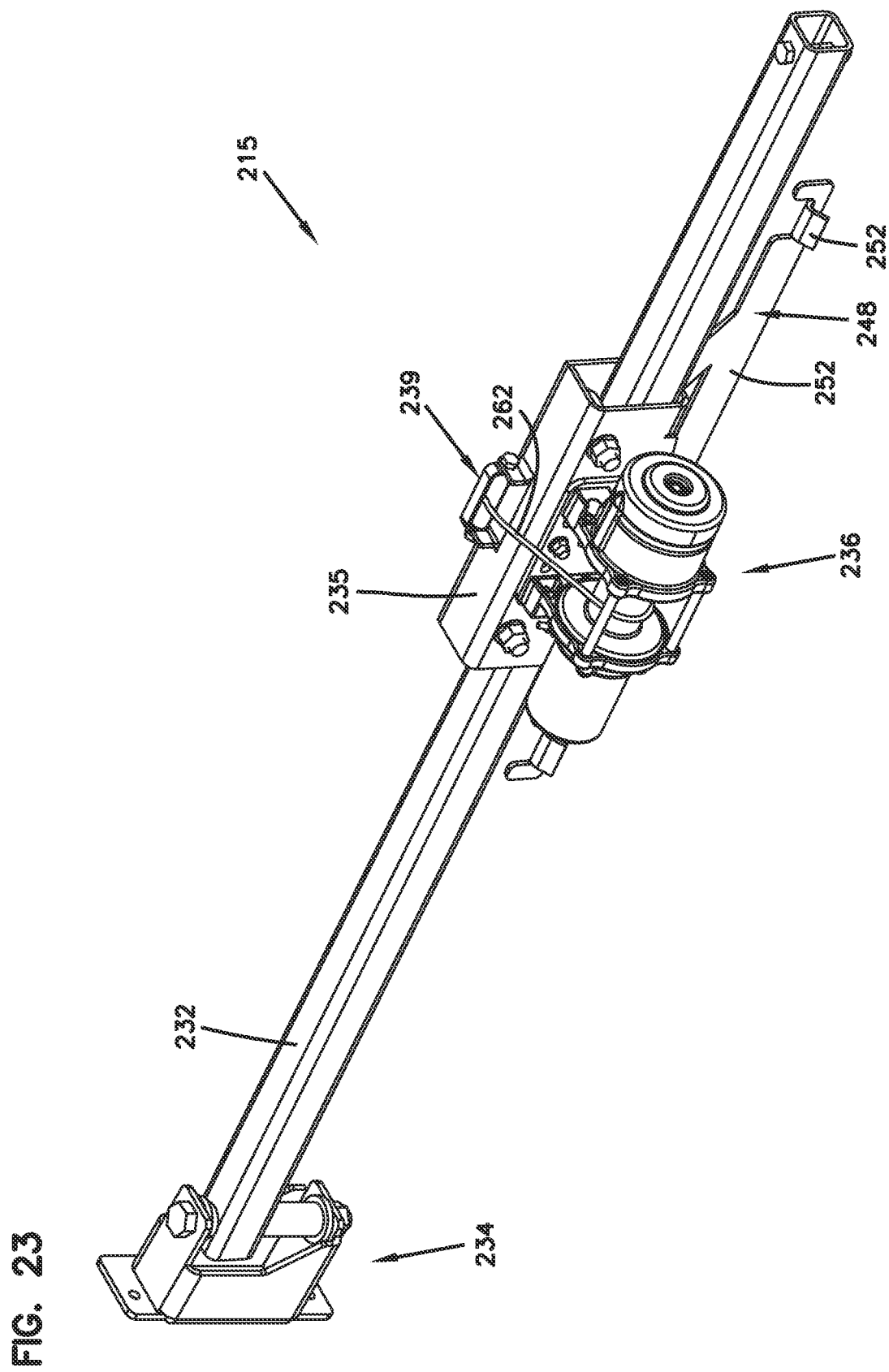
FIG. 23 is perspective view of a wrap material transfer device for a baler, according to one embodiment of the present disclosure.

FIGS. 21-22 show the transfer device 115 in an operational position that maximizes its overall length. The second member 144 is pivoted about the first member 142 via the arm member pivot 146 to align the first and second members 142, 144. FIG. 22 shows the bale adapter 148 lowered from the lifting device 136 via the cable 162. In some examples, the lifting device 136 can include enough cable length to reach the ground with the bale adapter 148 when it is extended from the lifting device 136.

FIGS. 23-26 show a transfer device 215, according to one embodiment of the present disclosure. The transfer device 215 includes an arm 232, a pivot 234, and lifting device 236. The transfer device 215 is substantially similar to the lifting device 115 described above and can be mounted to any location on the baler 100. However, the lifting device 236 is movable along a length of the arm 232 via a trolley 235. During operation, the arm 232 can be pivoted about the pivot 234 and the trolley 235 can be moved along the arm 232 to aid in transferring a wrap material roll 122 into, out of, and around the wrap material bay 119

Figure 24:
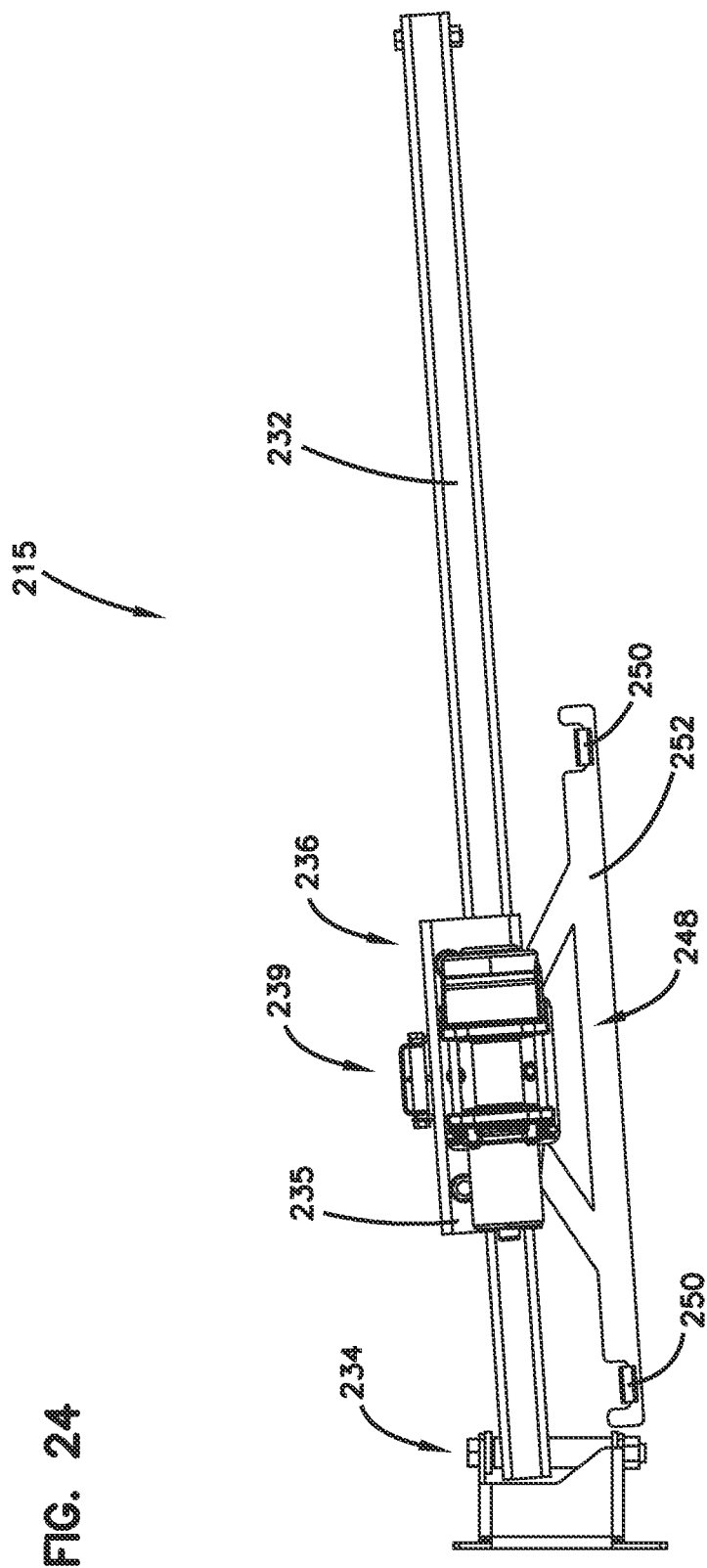
FIG. 24 is front view of the wrap material transfer device of FIG. 23 with a lifting device trolley in a first position.
Figure 25:
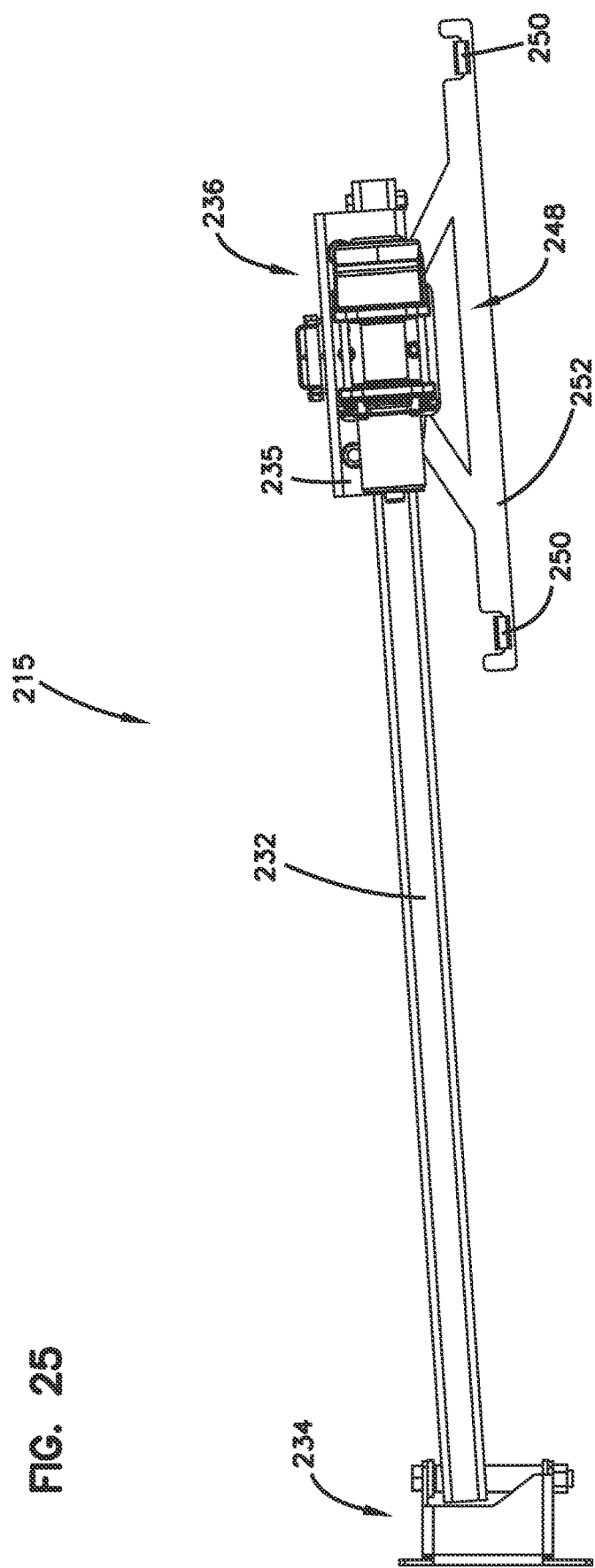
FIG. 25 is front view of the wrap material transfer device of FIG. 23 with a lifting device trolley in a second position.

FIG. 24 shows the trolley 235 positioned at a first location on the arm 232. FIG. 25 shows the trolley 235 positioned at a second location on the arm 232.

Figure 26:
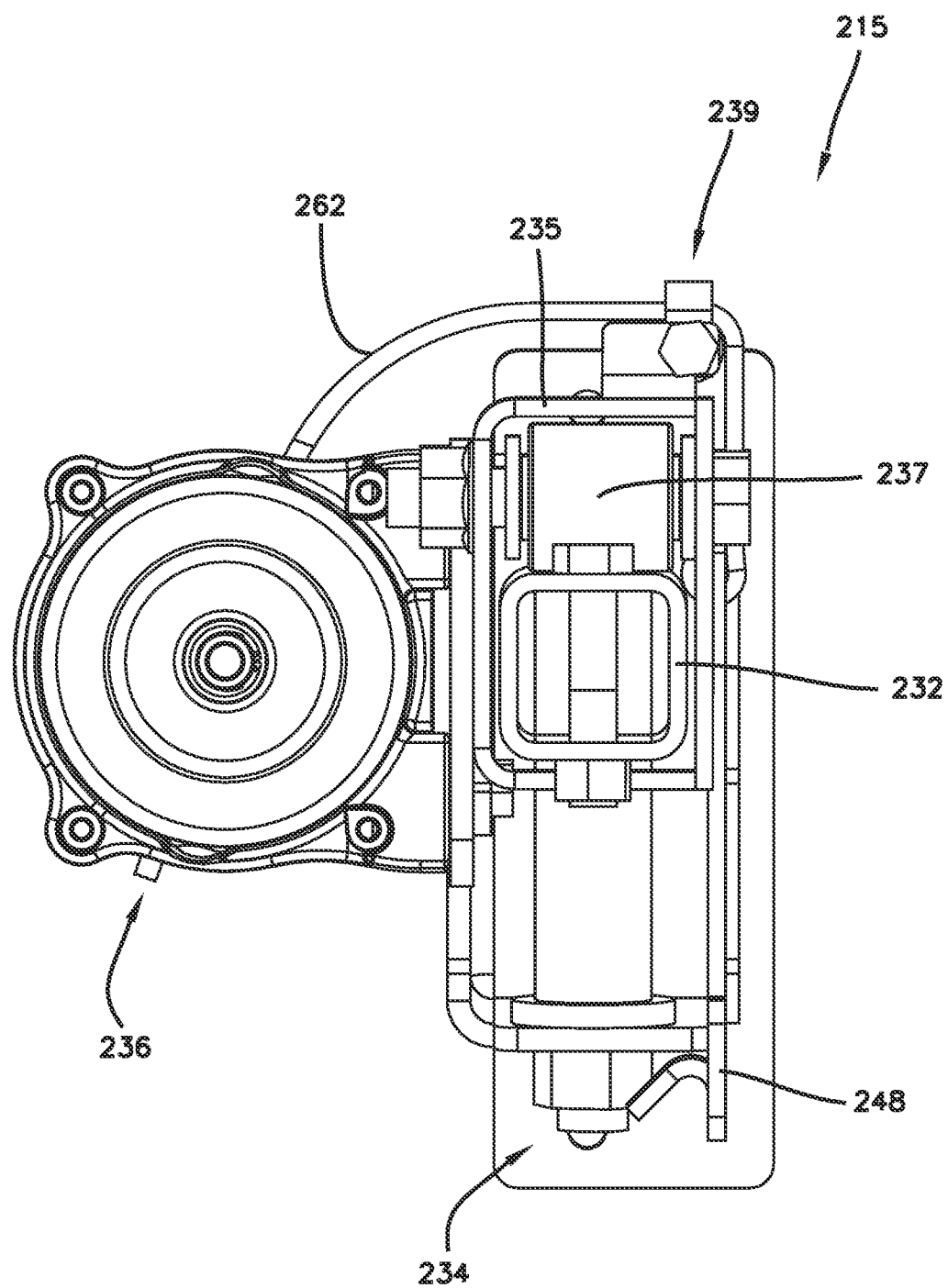
FIG. 26 is side view of the wrap material transfer device of FIG. 23.

As depicted, the trolley 235 substantially surrounds the arm 232 and the lifting device 236 can be mounted to the trolley 235. As shown in FIG. 26, the trolley 235 can include at least one roller 237 that aids in the movement of the trolley 235 along the arm 132. In some examples, the trolley 235 can also include a cable guide 239 for guiding a cable 262 of the lifting device 236.

A roll adapter 248 is shown to be attached to the lifting device 236. Like the roll adapter 148 described above, the roll adapter 248 includes a pair of hooks 250 on a main body 252 that are configured to interface with a wrap material roll 122.

Figure 27:
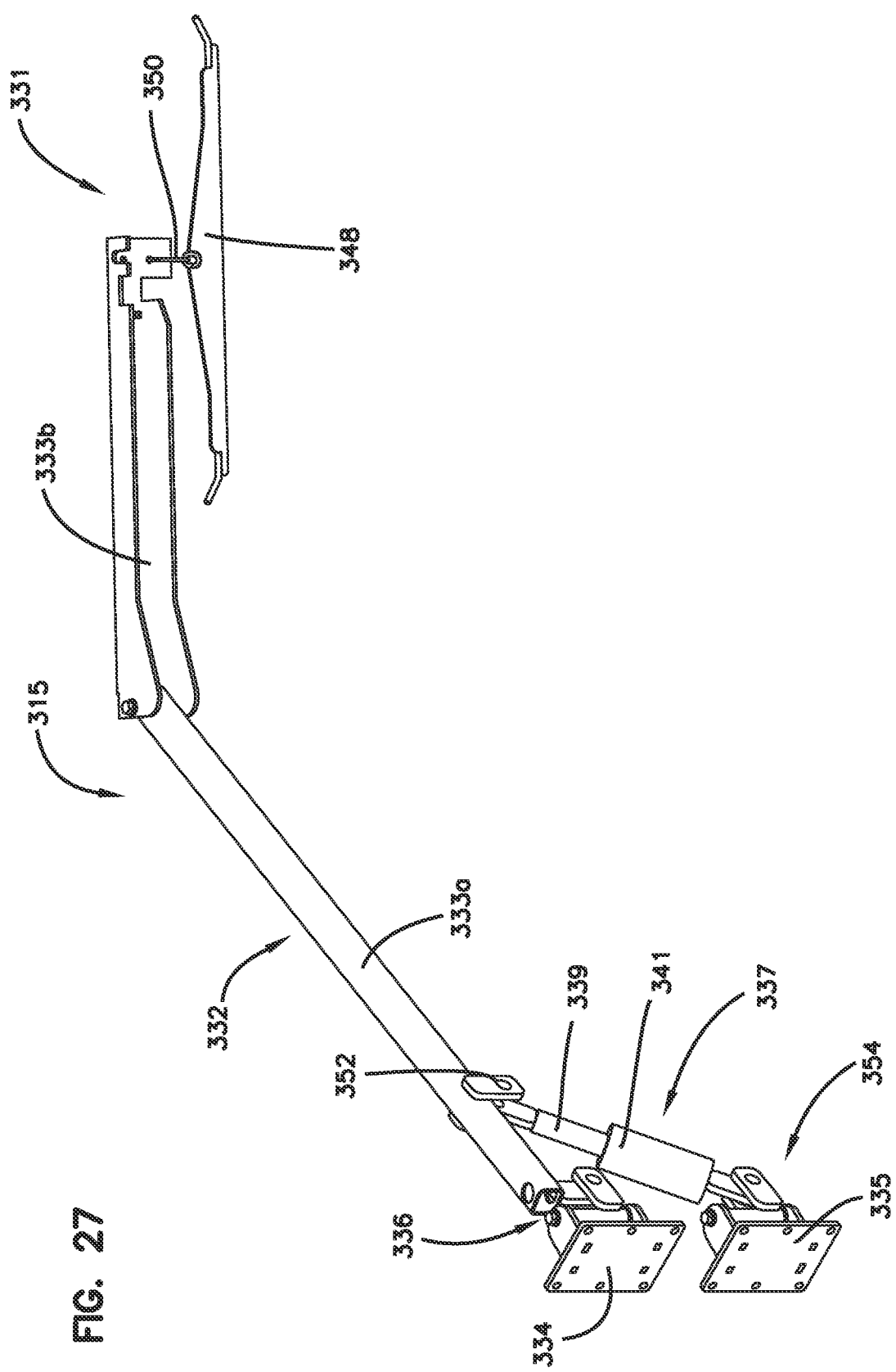
FIG. 27 is perspective view of a wrap material transfer device for a baler, according to one embodiment of the present disclosure.

FIG. 27 shows the transfer device 315, according to one embodiment of the present disclosure. As shown, the members 333a, 333b are movable with respect to one another. Further the arm 332, specifically the member 333a, is connected to the pivot 334 and the lifting actuator 337. The member 333a is connected to the pivot 334 via the joint 336 and connected to the lifting actuator 337 via the arm joint 352. In some examples, the joints 336, 352 allow for multi-axis pivotal movement of the arm 332 with respect to the pivot 334.

The lifting actuator 337, which includes the rod 339 and the cylinder 341, is attached to the arm 332 at the arm joint 352 and to the pivot 335 at a lifting actuator 337 joint 354. The joints 352, 354 allow for pivotal movement of the lifting actor 337 via the pivot 335 and arm 332. In some examples, the joints 336, 352, 354 can include spherical, or ball joints/bearings to allow multiple axis relative movement of the lifting actuator 332 and/or arm 332.

The lifting device 331 is shown to include the roll adapter 348 attached to the arm 332, specifically member 333b, via the pivot 350. In some examples, the roll adapter 348 can be rigidly attached to the arm 332 to prevent relative movement therebetween.

FIGS. 28-31 shows a transfer device 415, according to one embodiment of the present disclosure. Like the other transfer devices described above, the transfer device 415 allows the user to lift and transfer a bale wrap material roll 122 to, from, and within the wrap material bay 119. The transfer device 415 includes a pair of collapsible arms 432, 433 that are pivotally connected to the baler 100, specifically to opposing sides of the baler frame 121. In some examples, the transfer device 415 can include a lifting actuator 437, substantially similar to the lifting actuator 337 above, to aid in lifting the material roll 122 into the material bay 119. In some examples, the lifting actuator 437 can be remotely operated. In some examples, the arms 432, 433 include joints that allow for multi-axis pivotal movement of the arms 432, 433.

Figure 28:
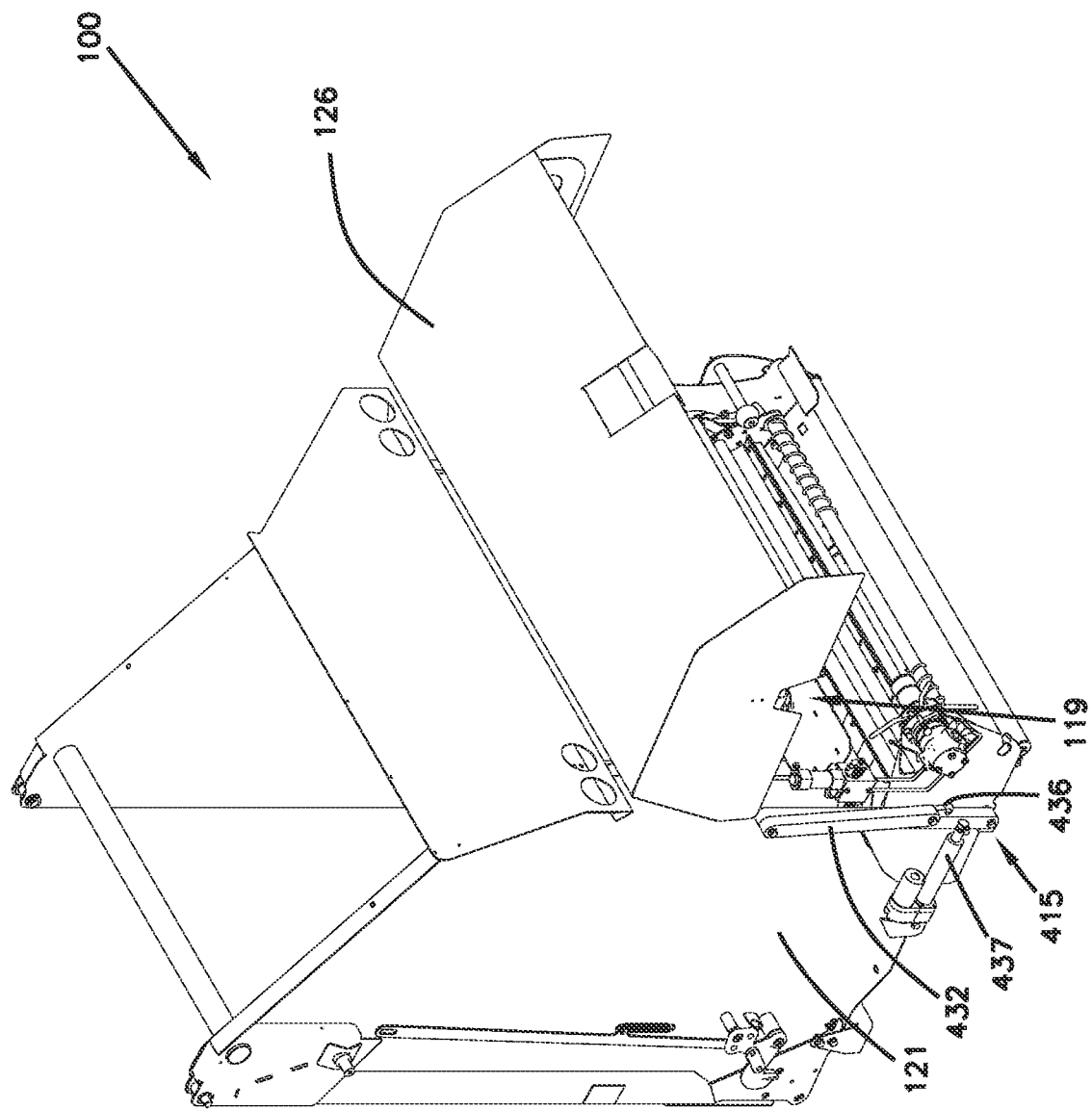
FIG. 28 is a perspective view of a wrap material transfer device for a baler in a stored position, according to one embodiment of the present disclosure.

FIG. 28 shows the transfer device 415 in the collapsed, stored position.

Figure 29:
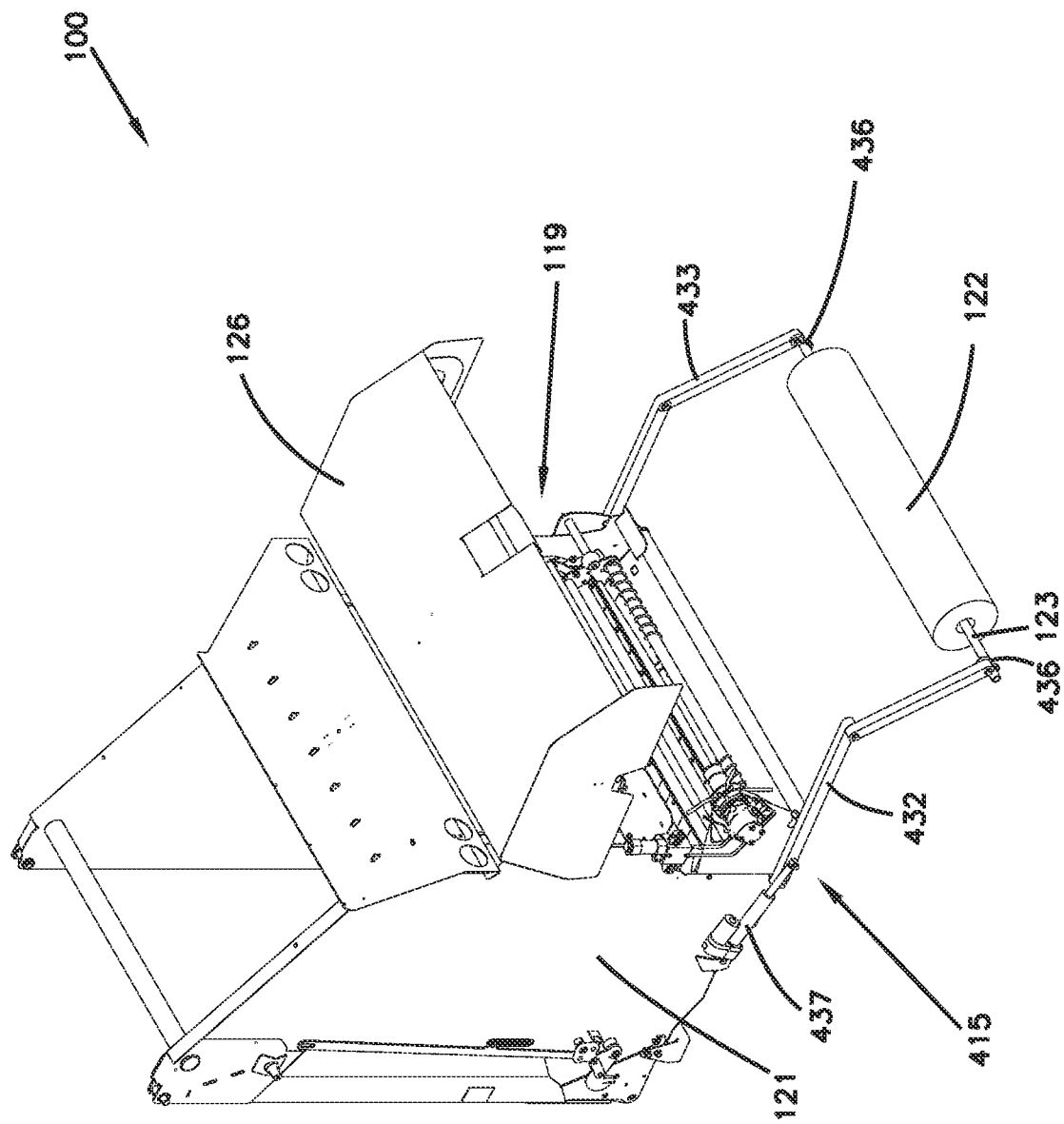
FIG. 29 is a side view of the wrap material transfer device of FIG. 28 with the wrap material transfer device in an operational position.

FIG. 29 shows the transfer device 415, specifically the arms 432, 433, in the extended and lowered operational position engaging with the material roll 122. In some examples, the arms 432, 433 of the transfer device 415 engage with an inner core 123 of the material roll 122. In some examples, the arms 432, 433 include a lifting device 436, such as hooks, straps, loops, or the like to engage with the material roll 122. It is considered within the scope of the present disclosure that a variety of different lifting devices can be utilized by the transfer device 415 to engage with the material roll 122.

Figure 30:
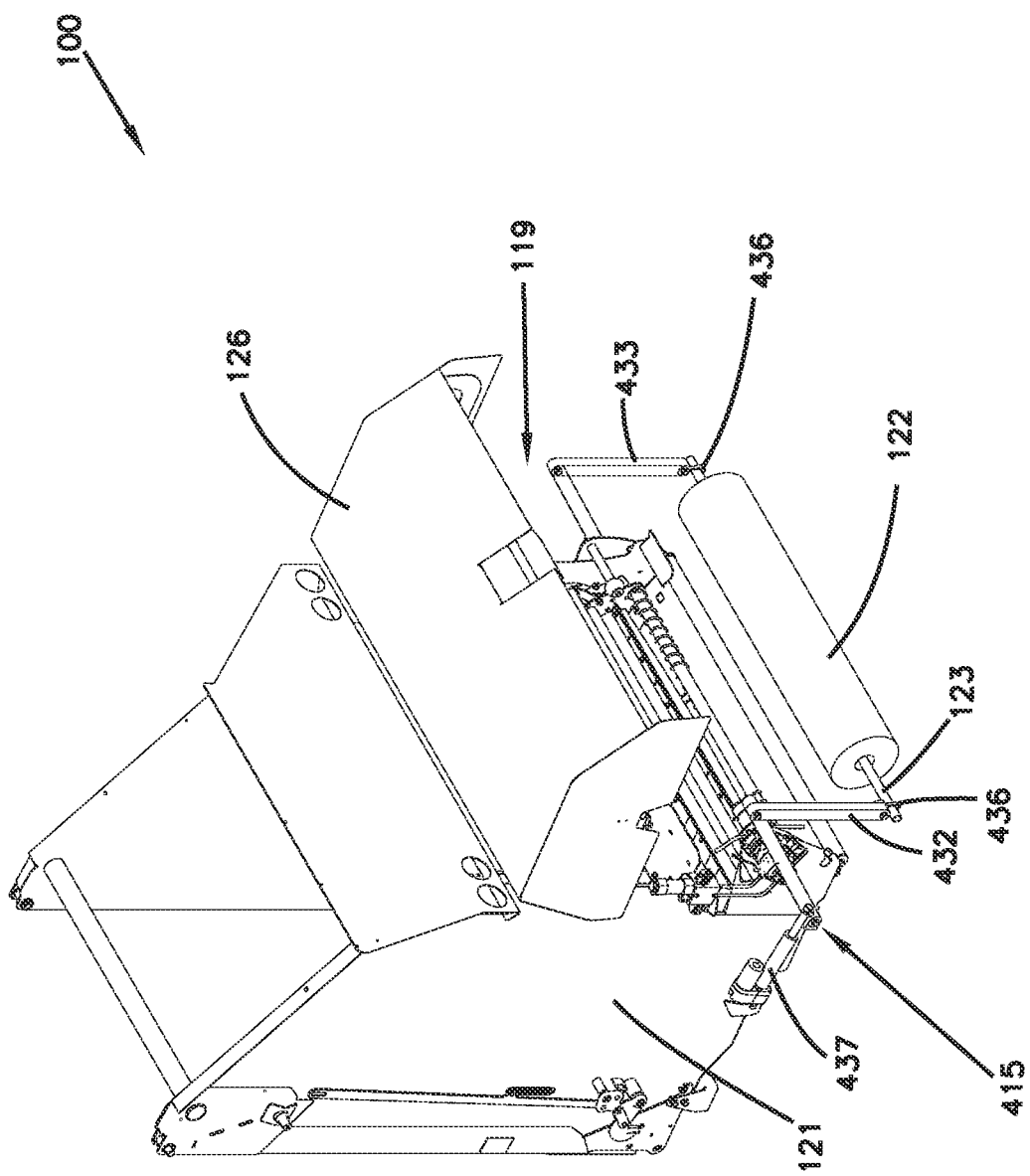
FIG. 30 is another side view of the wrap material transfer device of FIG. 28 with the wrap material transfer device in another operational position.

FIG. 30 shows the arms 432, 433 of the transfer device 415 partially collapsed and in an operational position. The material roll 122 is shown partially raised and moved closer to the material bay 119 by the transfer device 415.

Figure 31:
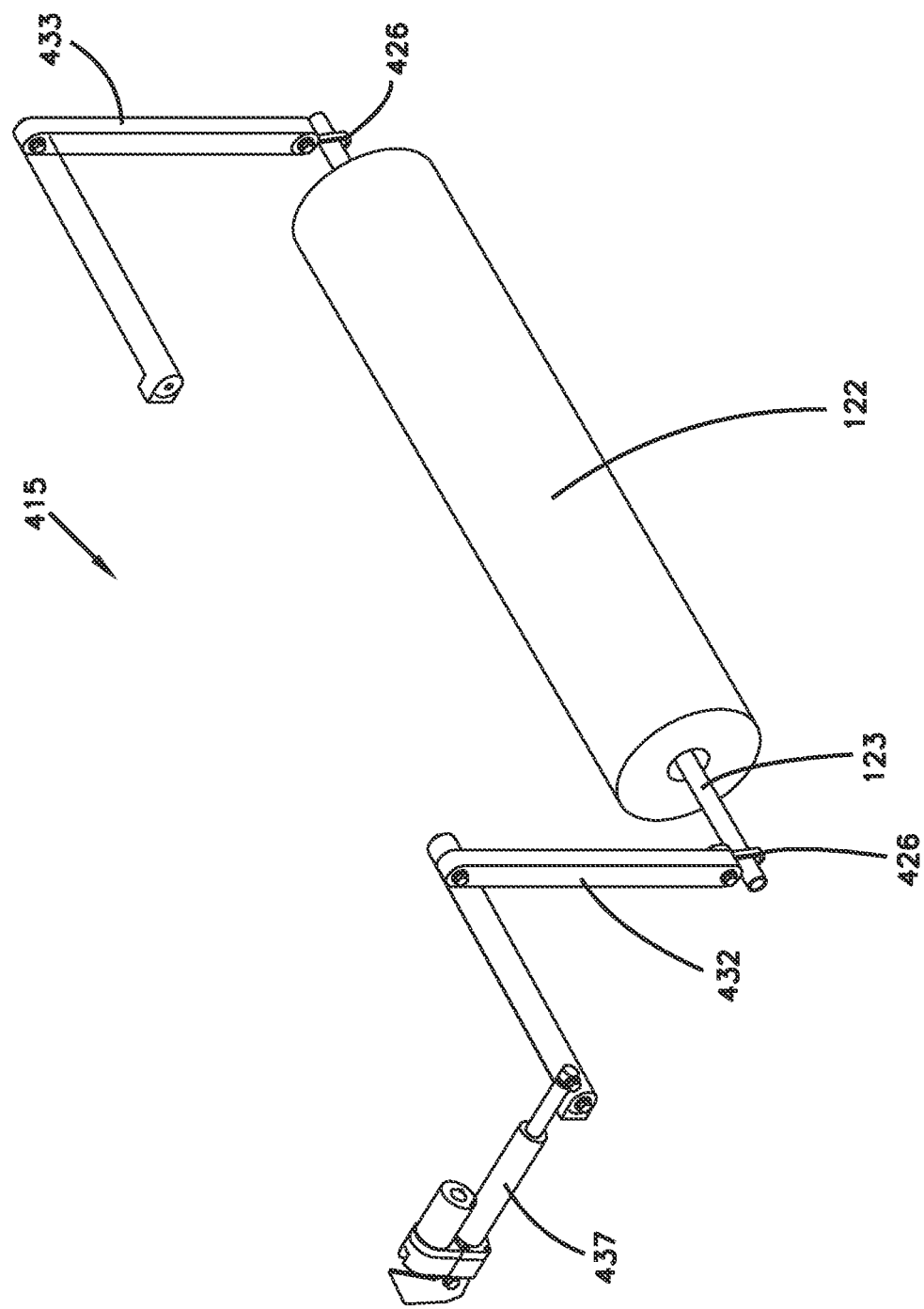
FIG. 31 is another perspective view of the wrap material transfer device of FIG. 28.

FIG. 31 shows the transfer device 415 removed from the baler 100. While a single actuator 437 is shown, the transfer device 415 can also include a pair of actuators as well.

EXAMPLES

Illustrative examples of the bale wrap tensioning system disclosed herein are provided below. An embodiment of the bale wrap material transfer device may include any one or more, and any combination of, the examples described below.

Example 1 is a transfer device for a bale wrap material supply roll. The transfer device includes an arm that has a first end and a second end. The transfer device includes a pivot positioned at the first end of the arm. The pivot is configured to be secured to a baling machine. The transfer device includes a lifting device positioned on the arm. The lifting device is configured to be attached to a bale wrap material supply roll.

In Example 2, the subject matter of Example 1 is further configured such that the arm further comprises a first member and a second member, wherein the first member is pivotally attached to the second member.

In Example 3, the subject matter of Example 2 is further configured such that the first and second members are configured to nest together when positioned longitudinally adjacent one another.

In Example 4, the subject matter of Example 2 is further configured such that at least one of the first and second arm members has a channel that is configured to receive the at least one of the first and second arm members.

In Example 5, the subject matter of Example 1 is further configured such that the lifting device includes at least one of a hoist and an actuator.

In Example 6, the subject matter of Example 1 is further configured such that the lifting device is secured to the arm to be slidable between the first and second ends.

In Example 7, the subject matter of Example 1 further includes a roll adapter connected to the lifting device. The roll adaptor is configured to be attached to a bale wrap material supply roll to stably support the bale wrap material supply roll in space.

In Example 8, the subject matter of Example 7 is further configured such that the roll adapter is extendable from the arm via the lifting device.

In Example 9, the subject matter of Example 1 is further configured such that the arm is telescoping.

In Example 10, the subject matter of Example 1 is further configured such that the transfer device has a stored position and a plurality of operating positions. When in the plurality of operating positions, the transfer device is configured to lift and transfer the wrap material supply roll.

In Example 11, the subject matter of Example 10 is further configured such that when the transfer device is in the stored position, the transfer device is at least partially positioned under a wrap material bay cover coupled to a baler frame, and the wrap material bay cover at least partially encloses a wrap material bay for storing wrap material, the wrap material bay cover being movable to selectively provide access to the wrap material bay.

In Example 12, the subject matter of Example 1 is further configured such that the pivot is a first pivot. The transfer device further comprises a lifting actuator pivotally attached to the arm and to a second pivot. The second pivot is configured to be attached to the baling machine. The lifting actuator is extendable to assist pivotal movement of the arm about the first pivot.

In Example 13, the subject matter of Example 12 is further configured such that the first pivot includes a horizontal pivot axis and a vertical pivot axis. The horizontal pivot axis is generally transverse to the vertical pivot axis. The arm is movable about both the horizontal pivot axis and the vertical pivot axis. The second pivot includes a second horizontal pivot axis and a second vertical pivot axis and the second horizontal pivot axis is generally transverse to the second vertical pivot axis. The lifting actuator is movable about both the second horizontal pivot axis and the second vertical pivot axis.

In Example 14, the subject matter of Example 1 is further configured such that the pivot is installed on a baling machine. The baling machine has a frame, a baling chamber for creating a bale, and a wrap material bay for storing wrap material to be fed into the baling chamber.

In Example 15, the subject matter of Example 14 is further configured such that transfer device is installed in the wrap material bay.

Example 16 is a baling machine. The baling machine includes a frame and a baling chamber for creating a bale. The baling machine includes a wrap material bay for storing wrap material to be fed into the baling chamber. The baling machine includes a bale wrap material transfer device. The bale wrap material transfer device includes an arm having a first end and a second end. The bale wrap material transfer device includes a pivot positioned at the first end of the arm. The pivot is secured to the frame of the baling machine. The bale wrap material transfer device includes a lifting device positioned on the arm. The lifting device is configured to be attached to a bale wrap material supply roll. The bale wrap material transfer device is configured to lift, lower, and transfer a bale wrap material supply roll.

In Example 17, the subject matter of Example 16 is further configured such that the bale wrap material transfer device is installed in the wrap material bay.

In Example 18, the subject matter of Example 16 is further configured such that the bale wrap material transfer device has an arm pivotally connected to the frame, and the lifting device is attached to the arm.

In Example 19, the subject matter of Example 16 is further configured such that the arm further comprises a first member and a second member. The first member is hingedly attached to the second member.

In Example 20, the subject matter of Example 16 is further configured such that the arm of the bale wrap material transfer device is a first arm. The bale wrap material transfer device includes a second arm, and the first and second arms are collapsible.

Example 21 is a method of transferring a bale wrap material roll. The method includes extending an arm of a bale wrap material transfer device from a baler and lowering a portion of the bale wrap material transfer device. The method includes attaching a lifting device of the bale wrap material transfer device to a bale wrap material supply roll and raising a portion of the bale wrap material transfer device. The method includes positioning a bale wrap material supply roll on the baler for use.

In Example 22, the subject matter of Example 21 is further configured such that the bale wrap material transfer device includes an arm having a first end and a second end and a pivot positioned at the first end of the arm. The pivot is secured to the frame of the baler and the lifting device is positioned on the arm.

In Example 23, the subject matter of Example 21 is further configured such that the bale wrap material transfer device is installed in a wrap material bay.

In Example 24, the subject matter of Example 21 is further configured to include lowering the bale wrap material supply from the baler using the bale wrap material transfer device.

The various embodiments described above are provided by way of illustration only and should not be construed to limit the claims attached hereto. In addition, various aspects of preceding disclosure are applicable to both fixed chamber round balers and variable chamber round balers. Those skilled in the art will readily recognize various modifications and changes that may be made without following the example embodiments and applications illustrated and described herein, and without departing from the true spirit and scope of the following claims.

We claim:

1. A baling machine comprising:
   a baler frame including a front end, a rear end, and two opposing sidewalls extending between the front end and the rear end;
   a wrapping device having a wrap material bay, the wrapping device attached to the rear end of the baler frame and operable to dispense a supply of wrap material when the wrap material is located in the wrap material bay;
   a cover pivotally attached to the rear end of the baler frame, the cover being movable from the baler frame between closed and open positions to selectively provide access to the wrap material bay; and
   a wrap transfer device attached directly to the rear end of the baler frame and operable to support and transfer the wrap material relative to the baler frame, the wrap transfer device including:
      an arm having a first end and a second end, the first end of the arm pivotally attached to the rear end of the baler frame below a portion of the cover pivotally attached to the rear end of the baler frame,
      wherein the arm includes a first member attached to the rear end of the baler frame and defines the first end of the arm, and a second member pivotally attached to the first member at an arm member pivot, the second member defining the second end of the arm; and
      a lifting device positioned on the second member of the arm, wherein the lifting device is configured to be attached to the wrap material and operable to lower and lift the wrap material via a line,
   wherein the lifting device is operable to lower and lift the wrap material when the cover is in the open position and the wrap transfer device is positioned within the wrap material bay.

2. The baling machine of claim 1, wherein the first member and the second member are configured to nest together when positioned longitudinally adjacent one another.

3. The baling machine of claim 1, wherein at least one of the first member and the second member has a channel that is configured to receive the at least one of the first member and the second member.

4. The baling machine of claim 1, wherein the lifting device includes at least one of a hoist and an actuator.

5. The baling machine of claim 1, wherein the lifting device is secured to the arm to be slidable between the first end and the second end of the arm.

6. The baling machine of claim 1, further comprising a roll adapter connected to the lifting device, the roll adapter being configured to be attached to the wrap material to stably support the wrap material in space.

7. The baling machine of claim 6, wherein the roll adapter is extendable from the arm via the lifting device.

8. The baling machine of claim 1, wherein the arm is telescoping.

9. The baling machine of claim 1, further comprising a baling chamber, wherein the wrap material bay of the wrapping device is configured to store the wrap material to be fed into the baling chamber.

10. The baling machine of claim 1, wherein the wrap transfer device is installed in the wrap material bay.

11. The baling machine of claim 1, wherein the rear end of the baler frame includes a rear wall extending between the two opposing sidewalls, the arm being coupled to the rear wall.

12. The baling machine of claim 11, wherein the first end of the first member for the arm is pivotally coupled to the rear wall via a pivot, the first member of the arm configured to rotate the first member about a vertical axis, and the first member extending perpendicularly from the rear wall.

13. The baling machine of claim 11, wherein the arm is coupled to the rear wall, adjacent one of the two opposing sidewalls.

14. The baling machine of claim 1, wherein the wrapping device further includes:
   a housing mounted to the rear end of the baler frame, the housing defining a storage shelf included in the wrap material bay,
   wherein the arm is coupled to the rear end of the baler frame above at least one of the housing or the storage shelf.

15. A baling machine comprising:
   a baler frame;
   a wrapping device having a wrap material bay, the wrapping device attached to the baler frame and operable to dispense a supply of wrap material when the wrap material is located in the wrap material bay; and
   a wrap transfer device attached to the baler frame and operable to support and transfer the wrap material relative to the baler frame,
   wherein the wrap transfer device includes:
      an arm having a first end and a second end, the arm pivotally attached to the baler frame at the first end for rotation of the arm about a vertical axis, the arm including:
         a first member attached to the baler frame for rotation of the arm about the vertical axis, the first member defining the first end of the arm, and
         a second member pivotally attached to the first member at an arm member pivot, the second member pivotably rotatable about the vertical axis via the arm member pivot, for extension of the second member from the first member to increase a length of the wrap transfer device, the second member defining the second end of the arm; and
      a lifting device positioned on the second member of the arm, directly adjacent the second end of the arm, wherein the lifting device is configured to be attached to the wrap material and operable to lower and lift the wrap material via a line, wherein the arm extends from the first end to the second end, with the second end of the arm positioned to lower the wrap material within the wrap material bay.

16. The baling machine of claim 15, further comprising a cover pivotally attached to the baler frame.

17. The baling machine of claim 16, wherein the cover is movable from the baler frame between closed and open positions, and wherein the wrap transfer device is under the cover.

18. The baling machine of claim 15, further comprising a storage shelf for storing the wrap material.

19. The baling machine of claim 18, wherein the first end of the arm is attached to the baler frame above the storage shelf.

20. The baling machine of claim 15, wherein the lifting device includes an actuator.

* * * * *